(12) United States Patent
Mitani

(10) Patent No.: US 8,781,163 B2
(45) Date of Patent: Jul. 15, 2014

(54) IMAGE PROCESSING APPARATUS, IMAGE PROCESSING METHOD, IMAGE PROCESSING PROGRAM AND ELECTRONIC APPARATUS FOR EXTRACATING A CHARACTERISTIC POINT FROM AN IMAGE

(75) Inventor: Satoshi Mitani, Kanagawa (JP)

(73) Assignee: Sony Corporation, Tokyo (JP)

( * ) Notice: Subject to any disclaimer, the term of this patent is extended or adjusted under 35 U.S.C. 154(b) by 689 days.

(21) Appl. No.: 13/022,161

(22) Filed: Feb. 7, 2011

(65) Prior Publication Data

US 2011/0196240 A1 Aug. 11, 2011

(30) Foreign Application Priority Data

Feb. 5, 2010 (JP) .............................. P2010-024056
Jan. 13, 2011 (JP) .............................. P2011-005186

(51) Int. Cl.
*G06K 9/00* (2006.01)
(52) U.S. Cl.
USPC .......................................... 382/103; 382/173
(58) Field of Classification Search
CPC .......... G06K 9/00033; G06K 9/00228; G06K 9/00234; G06K 9/00335; G06K 9/00389; G06K 2009/00013; G06K 2009/0006; G06T 7/0022; G06T 7/0097; G06T 7/408; G06T 2207/10152; G06T 2207/30088; G06T 2207/30196; G06F 3/017; H04N 5/23219
USPC ........... 382/100, 103, 104, 128, 173; 715/863
See application file for complete search history.

(56) References Cited

U.S. PATENT DOCUMENTS

| | | | | |
|---|---|---|---|---|
| 7,983,448 | B1 * | 7/2011 | da Vitoria Lobo et al. | ... 382/103 |
| 2004/0190776 | A1 * | 9/2004 | Higaki et al. | .................. 382/190 |
| 2010/0329509 | A1 * | 12/2010 | Fahn et al. | ..................... 382/103 |

OTHER PUBLICATIONS

Yasurhiro Suzuki et al. Trans. Inst. Elect. Engnr. Jpn: "Detection Method of Skin Region by Near-IR Spectrum Multi-Band", vol. 127 No. 4, pp. 583-590, 2007.

* cited by examiner

*Primary Examiner* — Andrew W Johns
(74) *Attorney, Agent, or Firm* — K&L Gates LLP

(57) ABSTRACT

Disclosed herein is an image processing apparatus for extracting a characteristic point from an image. The image processing apparatus includes an image taking section configured to radiate light having a first wavelength on an image taking subject in order to generate a first photographing-result image and radiate light having a second wavelength on said image taking subject in order to generate a second photographing-result image. The image processing apparatus also includes a skin-area detection section configured to detect a skin area exposed to a skin of said image taking subject on the basis of said first photographing-result image and said second photographing-result image. The image processing apparatus further includes a characteristic-point extraction section configured to extract said characteristic point from an extraction area existing on a display image showing said image taking subject to serve as an extraction area including said skin area.

14 Claims, 15 Drawing Sheets

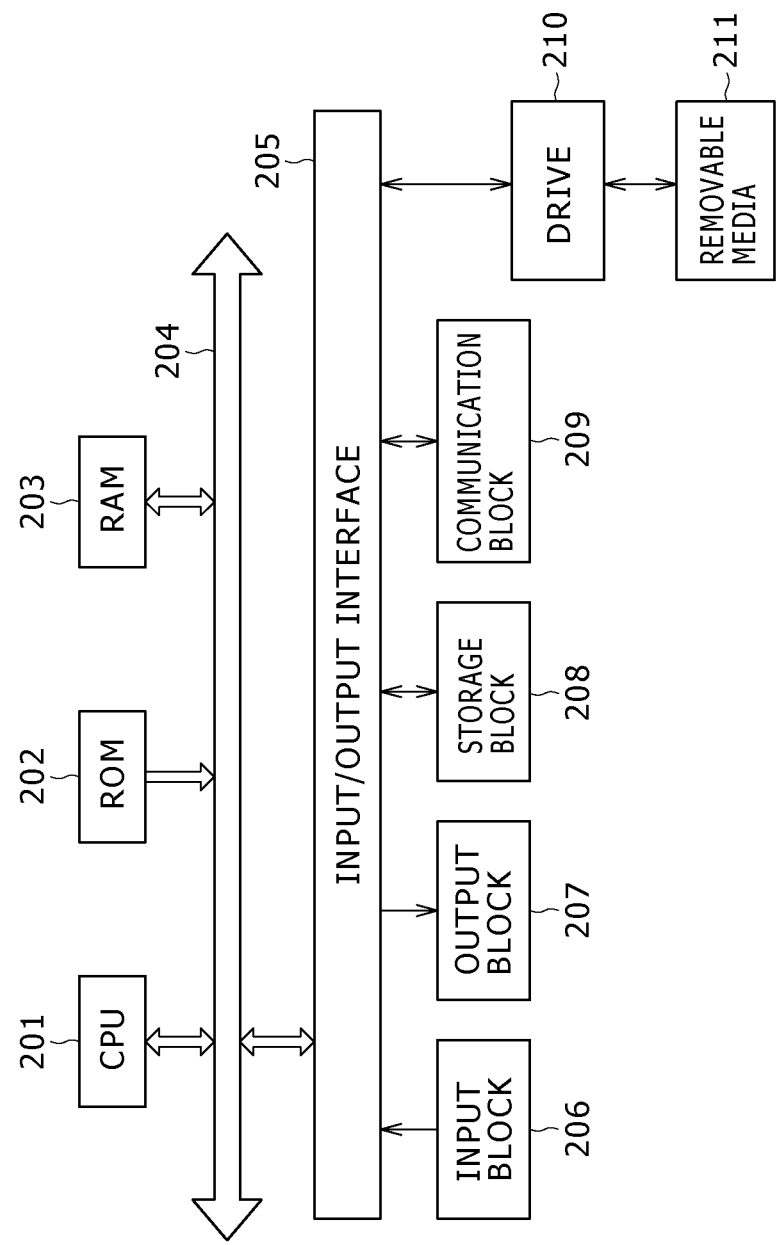

IMAGE PROCESSING APPARATUS, IMAGE PROCESSING METHOD, IMAGE PROCESSING PROGRAM AND ELECTRONIC APPARATUS FOR EXTRACATING A CHARACTERISTIC POINT FROM AN IMAGE

CROSS REFERENCES TO RELATED APPLICATIONS

The present application claims priority to Japanese Priority Patent Application No. 2011-005186 filed on Jan. 13, 2011 and Japanese Priority Patent Application No. 2010-024056 filed with the Japan Patent Office on Feb. 5, 2010, the entire content of which are hereby incorporated by reference

BACKGROUND

In general, the present application relates to an image processing apparatus, an image processing method, an image processing program and an electronic apparatus. More particularly, the present application relates to an excellent image processing apparatus, an image processing method, an image processing program, and an electronic apparatus for extracting a characteristic point from typically an image obtained as a result of an image taking operation carried out on the user.

There is researched an input technology to the personal computer or the like to be applied to an input device for inputting a command issued by a user. The input technology is a technology for inputting a command indicated a gesture or a posture of the user.

In the input technology, in order to recognize a user command indicated by a gesture or a posture expressed by a hand of the user for example, it is necessary to accurately detect typically a shape created by a hand of the user or the position of the tip of a middle finger of the user from an image obtained as a result of an image taking operation carried out on the user.

There is a skin recognition system for detecting typically the shape of a hand of the user by detecting (or recognizing) a skin area representing a skin of a human being from an image obtained as a result of an image taking operation carried out on an image taking subject (refer to Suzuki Yasuhiro et al., Electrical Engineering Thesis C (Detection Method of Skin Region by Near-IR Spectrum Multi-Band), Japan, 2007, Vol. 127, No. 4).

In the above skin recognition system, an LED (light emitting diode) for radiating light with a wavelength $\lambda 1$ to an image taking subject and an LED for radiating light with a wavelength $\lambda 2$ different from the wavelength $\lambda 1$ to the same image taking subject are driven alternately to emit the light to the image taking subject. A typical example of the light with the wavelength $\lambda 1$ is the near infrared ray having a wavelength of 870 nm whereas a typical example of the light with the wavelength $\lambda 2$ is the near infrared ray having a wavelength of 950 nm.

It is to be noted that the wavelength $\lambda 1$ and the wavelength $\lambda 2$ to be combined with the wavelength $\lambda 1$ as described above are typically determined as follows. The wavelength $\lambda 1$ and the wavelength $\lambda 2$ are set at such values that the reflection ratio of the light with the wavelength $\lambda 1$ radiated to the skin of a human being is higher than the reflection ratio of the light with the wavelength $\lambda 2$ radiated to the skin of a human being whereas the reflection ratio of the light with the wavelength $\lambda 1$ radiated to a subject other than the skin of a human being is about equal to the reflection ratio of the light with the wavelength $\lambda 2$ radiated to the subject other than the skin of a human being.

Then, in the skin recognition system, the LED for radiating the light with the wavelength $\lambda 1$ is used for creating a first photographing-result image while the light with the wavelength $\lambda 1$ is being radiated to the image taking subject.

By the same token, the LED for radiating the light with the wavelength $\lambda 2$ is used for creating a second photographing-result image while the light with the wavelength $\lambda 2$ is being radiated to the image taking subject.

Then, on the basis of the first photographing-result image and the second photographing-result image, a skin area is detected from either the first photographing-result image or the second photographing-result image.

That is to say, the skin recognition system adopts a wavelength combination in which the wavelength $\lambda 1$ and the wavelength $\lambda 2$ are set at such values that the reflection ratio of the light with the wavelength $\lambda 1$ radiated to the skin of a human being is higher than the reflection ratio of the light with the wavelength $\lambda 2$ radiated to the skin of a human being as described above.

Thus, the luminance value of every pixel composing a skin area on the first photographing-result image is relatively large whereas the luminance value of every pixel composing a skin area on the second photographing-result image is relatively small. As a result, the absolute value of a difference in luminance value between every individual pixel included in the skin area on the first photographing-result image and the second photographing-result image is relatively large.

In addition, the skin recognition system adopts a wavelength combination in which the wavelength $\lambda 1$ and the wavelength $\lambda 2$ are set at such values that the reflection ratio of the light with the wavelength $\lambda 1$ radiated to a subject other than the skin of a human being is about equal to the reflection ratio of the light with the wavelength $\lambda 2$ radiated to the subject other than the skin of a human being as described above.

Thus, the luminance value of every individual pixel included in a subject existing on the first photographing-result image as a subject other than a skin area is about equal to the luminance value of a pixel included in the subject existing on the second photographing-result image to serve as a pixel corresponding to the individual pixel. As a result, the absolute value of a difference in luminance value between every individual pixel included in the subject other than the skin area on the first photographing-result image and the second photographing-result image is relatively small.

Accordingly, if the absolute value of a difference in luminance value between every individual pixel included in the skin area on the first photographing-result image taken by the skin recognition system and a pixel included in the skin area on the second photographing-result image taken by the skin recognition system to serve as a pixel corresponding to the individual pixel is relatively large, the skin recognition system is capable of determining that the areas on the first photographing-result image and on the second photographing-result image are skin areas.

SUMMARY

The skin recognition system described above is capable of detecting typically a shape formed by a hand of the user from an image as a skin area. However, the skin recognition system is not capable of extracting a characteristic point representing the position of typically the tip of a middle finger of the user.

In order to solve the problem described above, there is provided a conceivable solution in which, in an operation carried out to extract the position of typically the tip of a middle finger of the user, the existing extraction technology for extracting a characteristic point by treating the entire area of an image as the subject of extraction is used in order to extract the characteristic point from the image.

In the case of the above solution to the problem, however, the entire area is used as the subject of extraction in the operation carried out to extract the characteristic point from the image. Thus, it takes very long time to complete the operation carried out to extract the characteristic point from the image.

Addressing the problem described above, inventor of the present application has made it possible to extract a characteristic point from an image in a shorter period of time and with a high degree of precision.

In accordance with an embodiment, there is provided an image processing apparatus for extracting a characteristic point from an image, the image processing apparatus including: a first light radiation section configured to radiate light having a first wavelength to an image taking subject; a second light radiation section configured to radiate light having a second wavelength greater than the first wavelength to the image taking subject; an image taking section configured to carry out an image taking operation on the image taking subject by radiating light having the first wavelength to the image taking subject in order to generate a first photographing-result image and carry out an image taking operation on the image taking subject by radiating light having the second wavelength to the image taking subject in order to generate a second photographing-result image; a skin-area detection section configured to detect a skin area exposed to a skin of the image taking subject on the basis of the first photographing-result image and the second photographing-result image; and a characteristic-point extraction section configured to extract the characteristic point from an extraction area existing on a display image showing the image taking subject to serve as an extraction area including the skin area.

It is possible to provide the image processing apparatus with a configuration in which a determination-information generation section generates determination information to be used for determining the extraction area on the basis of the skin area; and an extraction-area determination section determines the extraction area on the basis of the determination information.

It is also possible to provide the image processing apparatus with a configuration in which the determination-information generation section generates specification information to be used for specifying the skin area on the display image on the basis of the skin area detected by the skin-area detection section and takes the generated specification information as the determination information; and the extraction-area determination section determines the extraction area including the skin area, which is specified on the basis of the specification information, from the entire area of the display image.

It is also possible to provide the image processing apparatus with a configuration in which the determination-information generation section generates a reference, which is to be used by the extraction-area determination section to determine the extraction area, on the basis of the skin area and takes the reference as the determination information; and the extraction-area determination section determines the extraction area including the skin area from the entire area of the display image on the basis of the reference.

It is also possible to provide the image processing apparatus with a configuration in which the extraction-area determination section determines the extraction area having a predetermined shape and a predetermined size from the entire area of the display image.

It is also possible to provide the image processing apparatus with a configuration in which the extraction-area determination section determines the extraction area, which is configured to include a plurality of horizontal lines, from the entire area of the display image.

It is also possible to provide the image processing apparatus with a configuration in which the extraction-area determination section takes the more recently taken photographing-result image of the first and second photographing-result images as the display image and determines the extraction area from the entire area of the display image.

It is also possible to provide the image processing apparatus with a configuration in which the characteristic-point extraction section extracts the positions of pixels composing the skin area on the display image from the extraction area as the characteristic points and detects the skin area composed of the extracted characteristic points.

It is also possible to provide the image processing apparatus with a configuration in which the skin-area detection section detects the skin area on the basis of differences between luminance values of pixels in the first photographing-result image and luminance values of corresponding pixels in the second photographing-result image, ratios of the luminance values of the pixels in the first photographing-result image to the luminance values of the corresponding pixels in the second photographing-result image or absolute differences between the luminance values of the pixels in the first photographing-result image and the luminance values of the corresponding pixels in the second photographing-result image.

It is also possible to provide the image processing apparatus with a configuration in which the first wavelength denoted by symbol $\lambda 1$ and the second wavelength denoted by symbol $\lambda 2$ have values in the following ranges:

640 nm$\leq \lambda 1 \leq$1,000 nm; and
900 nm$\leq \lambda 2 \leq$1,100 nm.

It is also possible to provide the image processing apparatus with a configuration in which the first light radiation section radiates invisible light having the first wavelength $\lambda 1$ to the image taking subject; and the second light radiation section radiates invisible light having the second wavelength $\lambda 2$ to the image taking subject.

In accordance with the embodiment, there is provided an image processing method to be adopted by an image processing apparatus provided with a first light radiation section, a second light radiation section, an image taking section, a skin-area detection section, and a characteristic-point extraction section to serve as an apparatus for extracting a characteristic point from an image, the image processing method including the steps of driving: the first light radiation section to radiate light having a first wavelength to an image taking subject; the second light radiation section to radiate light having a second wavelength greater than the first wavelength to the image taking subject; the image taking section to carry out an image taking operation on the image taking subject by radiating light having the first wavelength to the image taking subject in order to generate a first photographing-result image and carry out an image taking operation on the image taking subject by radiating light having the second wavelength to the image taking subject in order to generate a second photographing-result image; the skin-area detection section to detect a skin area exposed to a skin of the image taking subject on the basis of the first photographing-result image and the second photographing-result image; and the characteristic-point extraction section to extract the characteristic point from an extraction area existing on a display image showing the image taking subject to serve as an extraction area including the skin area.

In accordance with the embodiment, there is provided an image processing program to be executed by a computer to carry out functions of: a skin-area detection section configured to detect a skin area exposed to a skin of an image taking subject on the basis of a first photographing-result image obtained as a result of an image taking operation carried out by radiating light having a first wavelength to the image taking subject and a second photographing-result image obtained as a result of an image taking operation carried out by radiating light having a second wavelength greater than the first wavelength to the image taking subject; and a characteristic-point extraction section configured to extract a characteristic point from an extraction area existing on a display image showing the image taking subject to serve as an extraction area including the skin area.

In accordance with the embodiment, there is provided an electronic apparatus having an embedded image processing apparatus for extracting a characteristic point from an image, the electronic apparatus including the image processing apparatus including: a first light radiation section configured to radiate light having a first wavelength to an image taking subject; a second light radiation section configured to radiate light having a second wavelength greater than the first wavelength to the image taking subject; an image taking section configured to carry out an image taking operation on the image taking subject by radiating light having the first wavelength to the image taking subject in order to generate a first photographing-result image and carry out an image taking operation on the image taking subject by radiating light having the second wavelength to the image taking subject in order to generate a second photographing-result image; a skin-area detection section configured to detect a skin area exposed to a skin of the image taking subject on the basis of the first photographing-result image and the second photographing-result image; and a characteristic-point extraction section configured to extract the characteristic point from an extraction area existing on a display image showing the image taking subject to serve as an extraction area including the skin area.

In accordance with the embodiment, on the basis of a first photographing-result image obtained as a result of an image taking operation carried out on an image taking subject by radiating light with a first wavelength to the subject and a second photographing-result image obtained as a result of an image taking operation carried out on the subject by radiating light with a second wavelength greater than the first wavelength to the subject, a skin area to which a skin of the subject has been exposed is detected and a characteristic point is extracted from an extraction area existing on a display image showing the subject as an extraction area including the skin area. In accordance with the present application, it is possible to extract a characteristic point from an image in a shorter period of time and with a high degree of precision.

Additional features and advantages are described herein, and will be apparent from the following Detailed Description and the figures.

BRIEF DESCRIPTION OF THE FIGURES

FIG. 16 is a block diagram showing a typical configuration of a computer driving the information processing system.

DETAILED DESCRIPTION

Embodiments of the present application will be described below in detail with reference to the drawings.

An implementation of the present application is described below. In the following description, the implementation is referred to as embodiments. It is to be noted that the embodiments are explained in chapters which are arranged as follows:

1. First Embodiment (A present-application implementation extracting a characteristic point from an extraction area determined on the basis of a position serving as a reference extracted from a binary-converted skin image)

2. Second Embodiment (A present-application implementation for extracting characteristic points from an extraction area including an entire area corresponding to a skin area on a binary-converted skin image)

3. Modified Versions

1. First Embodiment

Typical Configuration of an Information Processing System

Figure 1:
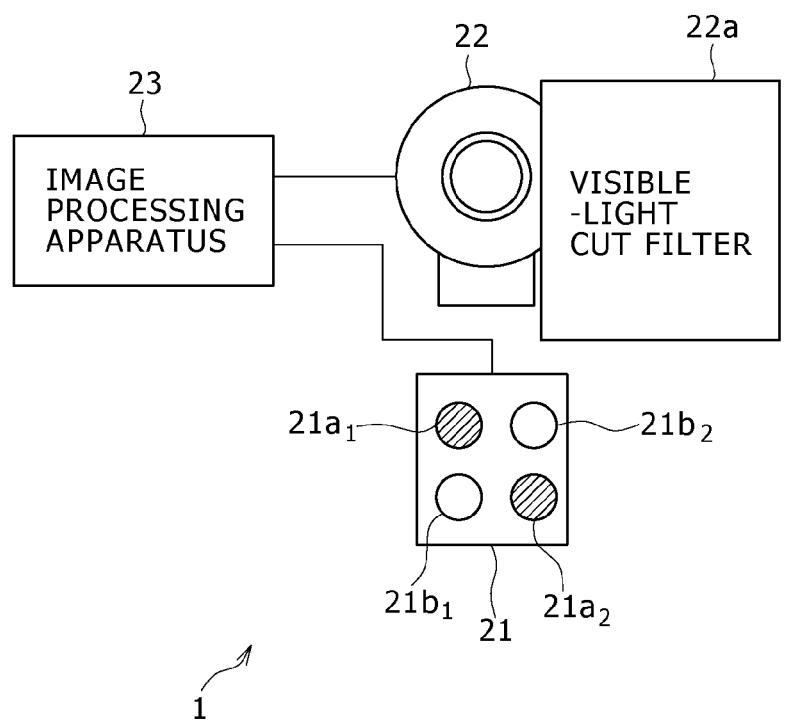
FIG. 1 is a block diagram showing a typical configuration of an information processing system to which an embodiment is applied.

FIG. 1 is a block diagram showing a typical configuration of an information processing system 1 according to a first embodiment.

The information processing system 1 carries out predetermined processing in accordance with a user gesture indicated by a hand of a user or a posture of the user. As shown in the figure, the information processing system 1 employs a light emitting apparatus 21, a camera 22 and an image processing apparatus 23.

That is to say, in order to drive the information processing system 1 to carry out the processing determined in advance for example, the user moves its own hand in front of the lens surface of the camera 22.

When the user is moving its own hand in front of the lens surface of the camera 22, the information processing system 1 recognizes a locus traced by the tip of a middle finger of the user and treats the locus as position information which serves as a characteristic point to be described later. Then, the information processing system 1 carries out typically processing to move a pointer displayed on a display apparatus which is not shown in the block diagram serving as FIG. 1.

The light emitting apparatus 21 employs an LED 21a1 and an LED 21a2 which each radiate (or emit) light with a wavelength 1. A typical example of the light with the wavelength $\lambda 1$ is near infrared ray with a wavelength of 870 nm. In addition, the light emitting apparatus 21 also employs an LED 21b1 and an LED 21b2 which each radiate (or emit) light with a wavelength $\lambda 2$. A typical example of the light with the wavelength $\lambda 2$ is near infrared ray with a wavelength of 950 nm.

It is to be noted that, in the following description, the LED 21a1 and the LED 21a2 are referred to as an LED 21a in case it is not necessary to distinguish the LED 21a1 and the LED 21a2 from each other. By the same token, the LED 21b1 and the LED 21b2 are referred to as an LED 21b in case it is not necessary to distinguish the LED 21b1 and the LED 21b2 from each other.

In accordance with control carried out by the image processing apparatus 23, the light emitting apparatus 21 drives the LED 21a and the LED 21b to emit light alternately.

For example, the LED 21a radiates light with the wavelength $\lambda 1$ to an image taking subject such as a mirror surface at a certain reflection ratio such as a reflection ratio of 100%. On the other hand, the LED 21b radiates light with the wavelength $\lambda 2$ to the same image taking subject at the same reflection ratio such as the reflection ratio of 100%. Even in this case, the light emitting apparatus 21 typically drives the LED 21a and the LED 21b to emit respectively the light with the wavelength $\lambda 1$ and the light with the wavelength $\lambda 2$ alternately so that the luminance value of every individual pixel on a photographing-result image obtained as a result of an image taking operation carried out by the camera 22 on the basis of the light with the wavelength $\lambda 1$ is equal to the luminance value of every pixel which exists on a photographing-result image obtained as a result of an image taking operation carried out by the camera 22 on the basis of the light with the wavelength $\lambda 2$ to serve as a pixel corresponding to the individual pixel.

In addition, the wavelength $\lambda 1$ and the wavelength $\lambda 2$ to be combined with the wavelength $\lambda 1$ as described above are typically determined as follows. The wavelength $\lambda 1$ and the wavelength $\lambda 2$ are set at such values that the reflection ratio of the light with the wavelength $\lambda 1$ radiated to the skin of a human being is higher than the reflection ratio of the light with the wavelength $\lambda 2$ radiated to the skin of a human being whereas the reflection ratio of the light with the wavelength $\lambda 1$ radiated to a subject other than the skin of a human being is about equal to the reflection ratio of the light with the wavelength $\lambda 2$ radiated to the subject other than the skin of a human being. That is to say, the wavelength $\lambda 1$ and the wavelength $\lambda 2$ to be combined with the wavelength $\lambda 1$ as described above are determined on the basis of the spectroscopic reflection characteristic for the skin of a human being.

Figure 2:
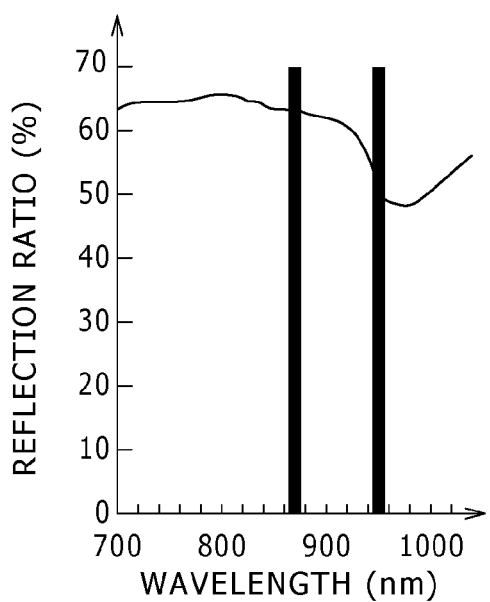
FIG. 2 is a diagram showing a typical spectroscopic reflection characteristic for the skin of a human being.

Next, FIG. 2 is given to serve as a diagram showing a spectroscopic reflection characteristic for the skin of a human being.

It is to be noted that the spectroscopic reflection characteristic exhibits generality which is independent of differences in color between skins of human beings and independent of the states of the skins. The differences in color between skins of human beings are caused by racial differences whereas a typical example of the state of a skin is a sunburned state.

In the diagram which serves as FIG. 2, the horizontal axis represents the wavelength of emitted light radiated to the skin of a human being whereas the vertical axis represents the reflection ratio of the emitted light radiated to the skin of a human being.

As shown by a curve in the figure, the reflection ratio of light radiated to the skin of a human being exhibits a peak in the neighborhood of a wavelength of 800 nm and starts to drop in the neighborhood of a wavelength of 900 nm, attaining a minimum value in the neighborhood of a wavelength of 1,000 nm. Then, the curve rises again from the minimum value.

To put it more concretely, as shown in the diagram which serves as FIG. 2 for example, the reflection ratio of light radiated to the skin of a human being as light with a wavelength of 870 nm is about 63% whereas the reflection ratio of light radiated to the skin of a human being as light with a wavelength of 950 nm is about 50%.

The spectroscopic reflection characteristic represented by the curve shown in the figure is inherent in the skin of a human being. For an object other than the skin of a human being, on the other hand, the changes of the reflection ratio in the range of approximately 800 to 1,000 nm are gradual in many cases. Typical examples of the object other than the skin of a human being are head hair and clothes.

In the case of this embodiment, in the spectroscopic reflection characteristic described above, the waveforms of 870 nm and 950 nm are typically taken as respectively the waveforms $\lambda 1$ and $\lambda 2$ which form the waveform combination described earlier. In this waveform combination, the difference between the reflection factor of light radiated to the skin of a human being as light with a waveform of 870 nm and light radiated to the skin of a human being as light with a waveform of 950 nm is relatively large. On the other hand, the difference between the reflection factor of light radiated to a portion other than the skin of a human being as light with a waveform of 870 nm and light radiated to the portion other than the skin of a human being as light with a waveform of 950 nm is relatively small.

Referring back to the block diagram which serves as FIG. 1, the camera 22 has a lens for taking an image of an image taking subject such as the user. The front surface of the lens is covered by a visible-light cut filter 22a for blocking out visible light.

Thus, except for the sunlight and components of invisible light emitted by a fluorescent lamp or the like, the camera 22 receives only reflected light obtained as a result of reflection of invisible light radiated by the light emitting apparatus 21 to the image taking subject. Then, the camera 22 supplies a photographing-result image obtained as a result of receiving the reflected light to the image processing apparatus 23.

That is to say, for example, the camera 22 receives only reflected light obtained as a result of reflection of invisible light radiated by the LED 21a to the image taking subject as invisible light with the wavelength In this case, the camera 22 supplies a first photographing-result image obtained as a result of receiving the reflected light with the wavelength $\lambda 1$ to the image processing apparatus 23.

As another example, the camera 22 receives only reflected light obtained as a result of reflection of invisible light radiated by the LED 21b to the image taking subject as invisible light with the wavelength λ2. In this case, the camera 22 supplies a second photographing-result image obtained as a result of receiving the reflected light with the wavelength λ2 to the image processing apparatus 23.

The image processing apparatus 23 controls the light emitting apparatus 21 and the camera 22.

On the basis of the first and second photographing-result images received from the camera 22, the image processing apparatus 23 selects one of the first and second photographing-result images. For example, the image processing apparatus 23 selects the first photographing-result image. In this case, the image processing apparatus 23 extracts a characteristic point to be used as a basis for carrying out processing determined in advance from the first photographing-result image. Then, the image processing apparatus 23 carries out the processing based on the extracted characteristic point.

To put it more concretely, for example, the image processing apparatus 23 extracts the tip of a middle finger of the user from the first photographing-result image as the characteristic point. Then, the image processing apparatus 23 controls a display apparatus not shown in the block diagram serving as FIG. 1 in order to carry out typically processing to move a pointer to a position indicated by the extracted characteristic point as a position on the screen of the display apparatus.

Typical Configuration of the Image Processing Apparatus

Figure 3:
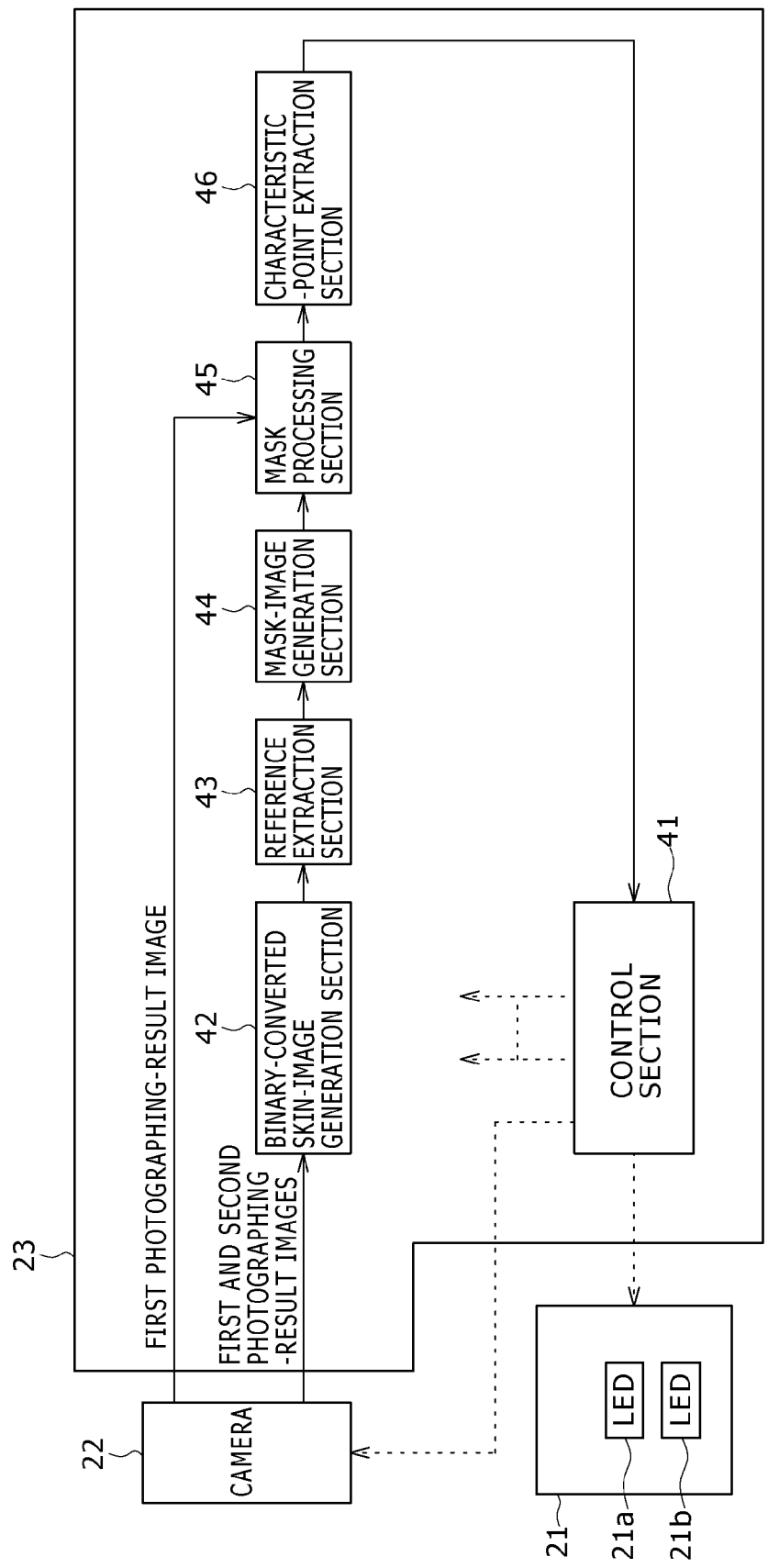
FIG. 3 is a block diagram showing a typical detailed configuration of an image processing apparatus employed in the information processing system.

Next, FIG. 3 is given to serve as a block diagram showing a typical detailed configuration of the image processing apparatus 23.

As shown in the figure, the image processing apparatus 23 employs a control section 41, a binary-converted skin-image generation section 42, a reference extraction section 43, a mask-image generation section 44, a mask processing section 45 and a characteristic-point extraction section 46.

The control section 41 controls the light emitting apparatus 21 in order to drive the LED 21a and the LED 21b, which are employed in the light emitting apparatus 21, to emit light alternately. In addition, the control section 41 also controls the camera 22 in order to drive the camera 22 to take images of the image taking subject.

On top of that, the control section 41 also controls the binary-converted skin-image generation section 42, the reference extraction section 43, the mask-image generation section 44, the mask processing section 45 and the characteristic-point extraction section 46. In addition, the control section 41 also carries out the processing based on the characteristic point received from the characteristic-point extraction section 46.

The binary-converted skin-image generation section 42 receives first and second photographing-result images from the camera 22. On the basis of the first and second photographing-result images received from the camera 22, the binary-converted skin-image generation section 42 generates a binary-converted skin image which is composed of a skin area typically represented by pixel values of 1 and a non-skin area typically represented by pixel values of 0. The non-skin area is an area other than the skin area.

Figure 4:
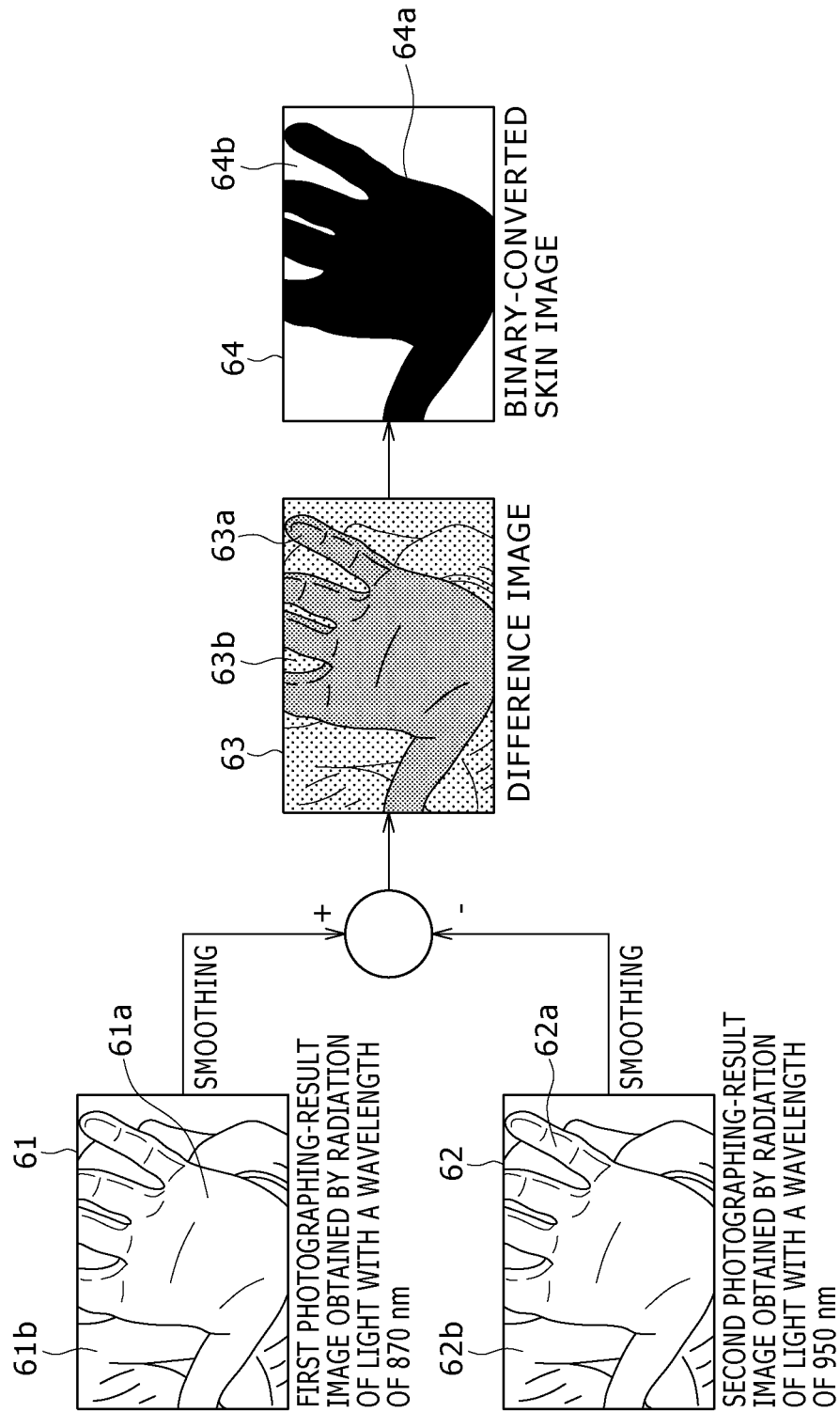
FIG. 4 is an explanatory diagram to be referred to in description of typical processing carried out by a binary-converted skin-image generation section employed in the information processing apparatus.

Next, FIG. 4 is given to serve as an explanatory diagram referred to in the following description of typical processing carried out by the binary-converted skin-image generation section 42.

The binary-converted skin-image generation section 42 receives a first photographing-result image 61 and a second photographing-result image 62 from the camera 22. As shown in the figure, the first photographing-result image 61 includes a skin area 61a and a non-skin area 61b which is an area outside the skin area 61a. By the same token, the second photographing-result image 62 includes a skin area 62a and a non-skin area 62b which is an area outside the skin area 62a.

The binary-converted skin-image generation section 42 carries out smoothing processing making use of an LPF (low pass filter) on the first photographing-result image 61 and the second photographing-result image 62 which have been received from the camera 22. Then, the binary-converted skin-image generation section 42 computes the absolute value of a difference between the luminance value of each individual pixel on the first photographing-result image 61 completing the smoothing processing and the luminance value of a pixel included in the second photographing-result image 62 also completing the smoothing processing to serve as a pixel corresponding to the individual pixel. Subsequently, the binary-converted skin-image generation section 42 generates a difference image 63 which includes difference-image pixels each having a pixel value equal to the absolute value of a difference in pixel value between pixels corresponding to the difference-image pixel.

Subsequently, for every pixel in the generated difference image 63, the binary-converted skin-image generation section 42 carries out binary conversion processing to set the pixel value equal to or not less than a threshold value determined in advance for the difference image 63 at 1 and the pixel value less than the predetermined threshold value at 0.

It is to be noted that a skin area 63a on the difference image 63 is an area overlapped the skin area 61a with the skin area 62a. The skin area 63a is composed of individual pixels each having a pixel value equal to the absolute value of a difference in pixel value between a pixel included in the skin area 61a to serve as a pixel corresponding to the individual pixel and a pixel included in the skin area 62a as a pixel also corresponding to the individual pixel. Thus, each individual pixel in the skin area 63a has a relatively large pixel value.

By the same token, a non-skin area 63b on the difference image 63 is composed of individual pixels each having a pixel value equal to the absolute value of a difference in pixel value between a pixel included in the non-skin area 61b to serve as a pixel corresponding to the individual pixel and a pixel included in the non-skin area 62b as a pixel also corresponding to the individual pixel. Thus, each individual pixel in the non-skin area 63b has a relatively small pixel value.

Accordingly, as a result of the binary conversion processing, the binary-converted skin-image generation section 42 generates a binary-converted skin image 64. That is to say, the binary-converted skin-image generation section 42 converts the difference image 63 into the binary-converted skin image 64. The binary-converted skin image 64 also has a skin area 64a composed of individual pixels each having a pixel value set at 1 because the pixel value of a pixel included in the skin area 63a to serve as a pixel corresponding to the individual pixel is equal to or not less than the threshold value determined in advance. In addition, the binary-converted skin image 64 also has a non-skin area 64b composed of individual pixels each having a pixel value set at 0 because the pixel value of a pixel included in the non-skin area 63b to serve as a pixel corresponding to the individual pixel is less than the threshold value determined in advance. In other words, for example, by carrying out the binary conversion processing, the binary-converted skin-image generation section 42 detects an area including pixels each having a luminance value of 1 as the skin area 64a and an area including pixels each having a luminance value of 0 as the non-skin area 64b. Then, the binary-converted skin-image generation section 42 generates the binary-converted skin image 64 composed of the skin area 64a and the non-skin area 64b.

Then, the binary-converted skin-image generation section 42 supplies the binary-converted skin image 64 obtained as a result of the binary conversion processing to the reference extraction section 43.

Referring back to the block diagram which serves as FIG. 3, the reference extraction section 43 extracts a reference from the binary-converted skin image 64 received from the binary-converted skin-image generation section 42. For example, the reference extraction section 43 extracts the position of the tip of a middle finger of the user from the binary-converted skin image 64.

Then, the reference extraction section 43 supplies the extracted position to the mask-image generation section 44 as the reference. Strictly speaking, the reference extraction section 43 supplies information on the extracted position to the mask-image generation section 44 as the reference. The reference will be used later as a basis for determination of an extraction area from the entire area of the first photographing-result image 61. The extraction area is an area from which a characteristic point is to be extracted.

It is to be noted that the reference extraction section 43 extracts the position of the tip of a middle finger of the user from the binary-converted skin image 64 which has been received from the binary-converted skin-image generation section 42 as described above. Since the extracted position of the tip of a middle finger of the user is merely an approximate position having poor precision, however, the extracted position is used as a reference as described above instead of being used as a characteristic point.

That is to say, there is a case in which an accurate binary-converted skin image 64 cannot be obtained. The inaccuracies of the binary-converted skin image 64 are caused by typically the fact that a region which should naturally be included in the skin area 64a is included in the non-skin area 64b due to, for example, reasons described as follows. In the camera 22, the image taking subject moves, causing an effect of a difference in movement between the first photographing-result image 61 and the second photographing-result image 62. In addition, there is also radiation unevenness of the LEDs 21a and 21b and an effect of external light.

Thus, even though an approximate position of the tip of a middle finger of the user can be extracted from the binary-converted skin image 64, extracting the accurate position of the tip of a middle finger of the user is extremely difficult.

As a result, as described above, the position extracted by the reference extraction section 43 from the binary-converted skin image 64 is used as a reference instead of being taken as a characteristic point.

Figure 5:
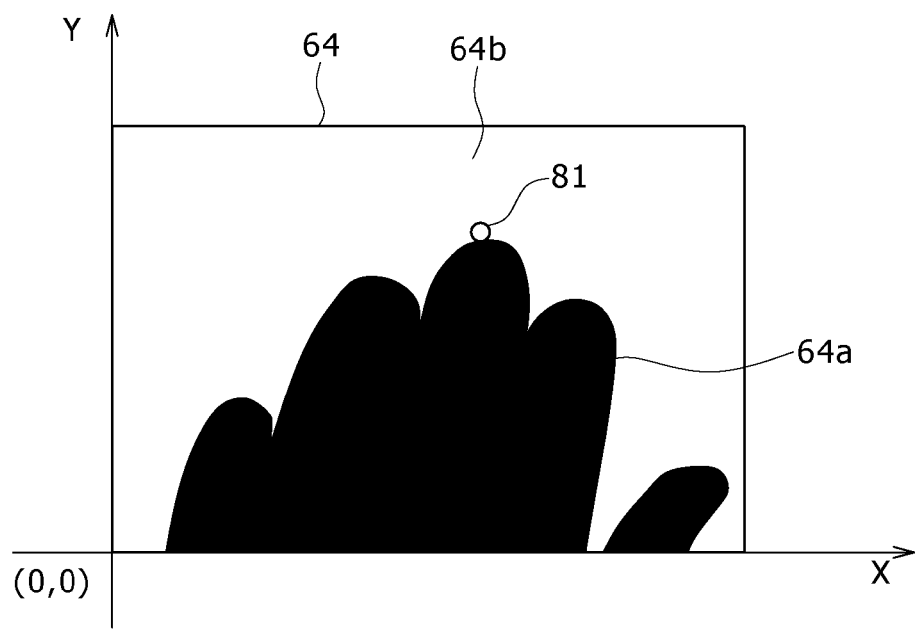
FIG. 5 is an explanatory diagram to be referred to in description of typical processing carried out by a reference extraction section employed in the information processing apparatus.

Next, FIG. 5 is given to serve as an explanatory diagram referred to in the following description of typical processing carried out by the reference extraction section 43.

The explanatory diagram serving as FIG. 5 shows a typical case in which a binary-converted skin image 64 is placed on an XY coordinate plane defined by X and Y axes.

It is to be noted that, in the explanatory diagram which serves as FIG. 5, pixels composing the binary-converted skin image 64 include a leftmost bottom pixel which is placed at the origin point (0, 0) of the XY coordinate plane.

For example, the reference extraction section 43 extracts a reference 81 and supplies the coordinates of the reference 81 to the mask-image generation section 44. As shown in the explanatory diagram serving as FIG. 5, the reference 81 is a point in the skin area 64a which is shown as an area having a black color. The skin area 64a includes a plurality of pixels each having coordinates (x, y). The reference 81 has coordinates (x, $y_{max}$) where the Y coordinate $y_{max}$ is the maximum value of coordinates y of the pixels composing the skin area 64a.

It is to be noted that there is a case in which the skin area 64a has a plurality of points each having the coordinates (x, $y_{max}$). In this case, the reference extraction section 43 selects a point having coordinates ($x_{max}$, $y_{max}$) among the points each having the coordinates (x, $y_{max}$) and takes the selected point having the coordinates ($x_{max}$, $y_{max}$) as the reference 81, supplying the coordinates of the reference 81 to the mask-image generation section 44. The X coordinate $x_{max}$ is the maximum value of coordinates y of the pixels composing the skin area 64a.

As described above, the reference extraction section 43 extracts the coordinates (x, $y_{max}$) from a plurality of coordinates (x, y) as the reference 81. However, methods for extracting the reference 81 are by no means limited to the technique described above.

Referring back to the block diagram which serves as FIG. 3, on the basis of the reference 81 received from the reference extraction section 43, the mask-image generation section 44 determines an extraction area. Then, the mask-image generation section 44 generates a mask image which specifies the determined extraction area from the entire area of the first photographing-result image 61.

Next, FIGS. 6A to 6C are diagrams each showing a typical mask image generated by the mask-image generation section 44.

As shown in the diagram serving as FIG. 6A for example, on the basis of the reference 81 received from the reference extraction section 43, the mask-image generation section 44 determines an area 101a with an elliptical shape including the reference 81 to serve as the extraction area and, then, generates a mask image which specifies the determined extraction area.

In addition, as shown in the diagram serving as FIG. 6B for example, on the basis of the reference 81 received from the reference extraction section 43, the mask-image generation section 44 determines an area 101b with a rectangular shape including the reference 81 to serve as the extraction area and, then, generates a mask image which specifies the determined extraction area.

It is to be noted that, in addition to the area 101a having the elliptical shape as shown in the diagram serving as FIG. 6A and the area 101b having the rectangular shape as shown in the diagram serving as FIG. 6B, on the basis of the reference 81 received from the reference extraction section 43, the mask-image generation section 44 may also determine an area with an arbitrary size and an arbitrary shape such as a triangular shape or a pentagonal shape to serve as the extraction area.

In addition, as shown in the diagram serving as FIG. 6C for example, on the basis of the reference 81 received from the reference extraction section 43, the mask-image generation section 44 determines an area 101c including the reference 81 to serve as the extraction area and, then, generates a mask image which specifies the determined extraction area. As shown in this figure, the area 101c is composed of a plurality of horizontal lines oriented in the X-axis direction which is the horizontal direction in the figure.

That is to say, as shown in the diagram serving as FIG. 6C for example, the mask-image generation section 44 determines an area 101c including the reference 81 to serve as the extraction area and, then, generates a mask image which specifies the determined extraction area. As shown in this figure, the area 101c is composed of a plurality of horizontal lines existing between an upper limit horizontal line separated away in the positive direction of the Y axis from the reference 81 received from the reference extraction section 43 by a distance determined in advance and a lower limit horizontal line separated away in the negative direction of the Y axis from the reference 81 by another distance determined in advance.

It is to be noted that, in addition to the mask image shown in the diagram serving as FIG. 6C, the mask-image generation section 44 may also determine an area to serve as the extraction area and, then, generates a mask image specifying the determined extraction area which is composed of a plurality of horizontal lines each separated away from the reference 81 received from the reference extraction section 43 in the positive or negative direction of the Y axis.

In addition, the mask-image generation section 44 may also determine an area to serve as the extraction area as follows. If the reference 81 received from the reference extraction section 43 is included in the upper half area of the entire area of the binary-converted skin image 64, the mask-image generation section 44 takes the upper half area as the extraction area. If the reference 81 received from the reference extraction section 43 is included in the lower half area of the entire area of the binary-converted skin image 64, on the other hand, the mask-image generation section 44 takes the lower half area as the extraction area.

Then, the mask-image generation section 44 supplies the generated mask image specifying the determined extraction area to the mask processing section 45.

It is to be noted that, if the mask-image generation section 44 determines the area 101c to serve as the extraction area on the basis of the reference 81 received from the reference extraction section 43, the amount of processing to be carried out to determine the extraction area is small in comparison with a case in which the an area 101a having an elliptical shape, the area 101b having the rectangular shape or an area having another shape is determined to serve as the extraction area.

Thus, if the mask-image generation section 44 selects the area 101c among a plurality of areas, i.e., the areas 101a to 101c, determines the selected area 101c to serve as the extraction area and then generates a mask image specifying the determined extraction area, the mask area can be generated in a shorter period of time.

For the reason described above, the following description explains a case in which, on the basis of the reference 81 received from the reference extraction section 43, the mask-image generation section 44 determines the area 101c to serve as the extraction area and generates a mask image specifying the determined extraction area.

Referring back to the block diagram which serves as FIG. 3, the mask processing section 45 receives the mask image from the mask-image generation section 44 and the first photographing-result image 61 or the second photographing-result image 62 from the camera 22. The following description explains a case in which the mask processing section 45 receives the first photographing-result image 61 from the camera 22, for example.

The mask processing section 45 extracts the extraction area, which is specified by the mask image received from the mask-image generation section 44, from the entire area of the first photographing-result image 61 supplied from the camera 22.

Typically, the mask image includes a mask area composed of pixels each having a pixel value of 1 and a non-mask area composed of pixels each having a pixel value of 0.

The mask processing section 45 extracts the extraction area corresponding to the mask area of the mask image supplied by the mask-image generation section 44 from the entire area of the first photographing-result image 61 supplied by the camera 22 by multiplying the pixel value of every individual pixel on the mask area by the pixel value of a pixel included in the first photographing-result image 61 to serve as a pixel corresponding with the individual pixel.

The mask processing section 45 supplies the extraction area extracted from the entire area of the first photographing-result image 61 to the characteristic-point extraction section 46.

It is desirable to provide a configuration in which the mask processing section 45 extracts the extraction area from the entire area of the most recent photographing-result image which can be a first photographing-result image 61 or a second photographing-result image 62. The most recent photographing-result image is a photographing-result image taken most recently.

In the case of such a configuration, the characteristic-point extraction section 46 to be described below is capable of extracting a characteristic point 121 from a photographing-result image which most reflects an input operation such as a gesture of the user.

The characteristic-point extraction section 46 extracts a characteristic point 121 from the extraction area received from the mask processing section 45 and supplies the characteristic point 121 to the control section 41. As described above, the extraction area is the area 101c on the first photographing-result image 61 like one shown in a diagram which serves as FIG. 7.

The control section 41 carries out predetermined processing based on the characteristic point 121 received from the characteristic-point extraction section 46. For example, the control section 41 controls a display apparatus shown in none of the figures to move a pointer of the display apparatus to a position located on the screen of the display apparatus as a position corresponding to the characteristic point 121 received from the characteristic-point extraction section 46.

It is to be noted that, as a typical method for extracting the characteristic point 121, for example, the characteristic-point extraction section 46 compares the shape of the skin area 61a in the extraction area 101c with typically the semicircular or circular shape of a fingertip model representing the tip of a middle finger of the user. Then, the characteristic-point extraction section 46 selects an area included in the extraction area 101c as an area best matching the fingertip model and extracts the position of the area best matching the fingertip model as a characteristic point.

As another typical method, the reference extraction section 43 computes the curvature of the contour of the skin area 61a in the extraction area 101c. The curvature of the contour represents the state in which the contour is bent. Then, on the basis of the computed curvature, the position at which the tip of a middle finger of the user is located is extracted as a characteristic point.

Figure 8:
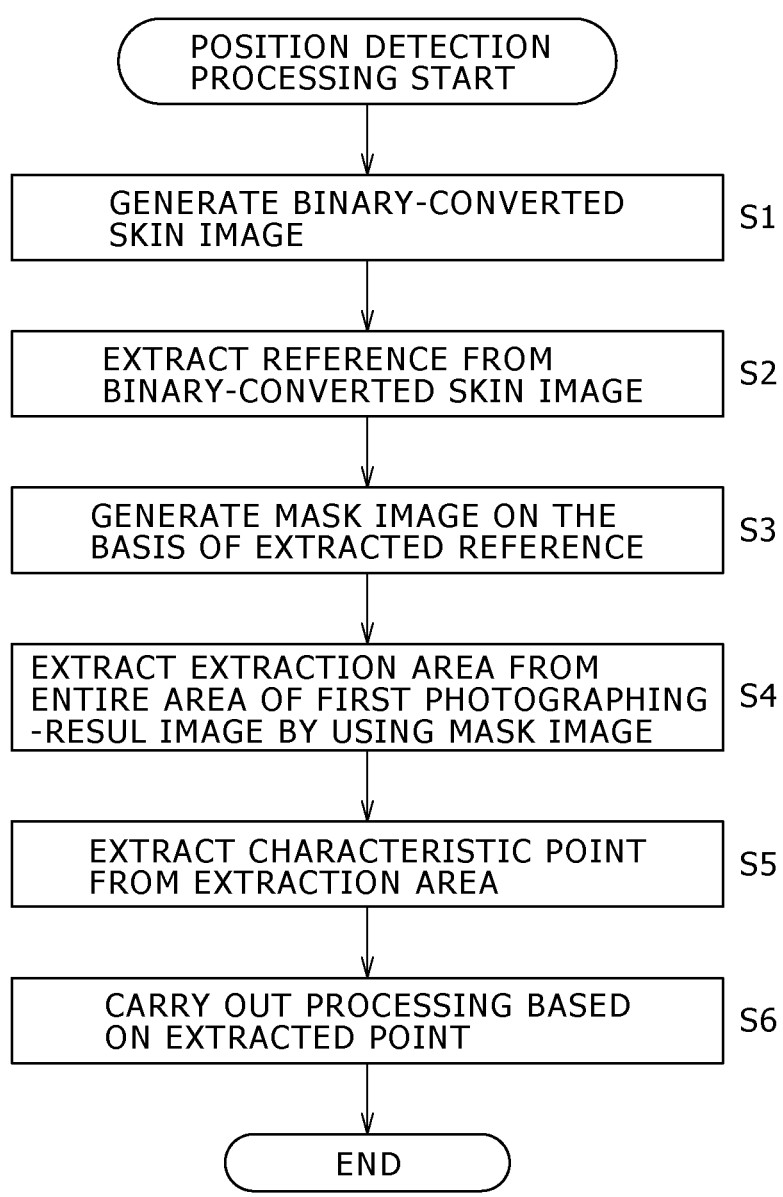
FIG. 8 shows an explanatory flowchart representing position detection processing carried out by the information processing system employing the image processing apparatus shown in FIG. 3.

Details of Position Detection Processing Carried Out by the Information Processing System Next, position detection processing carried out by the information processing system 1 employing the image processing apparatus 23 shown in FIG. 3 is explained by referring to a flowchart shown in FIG. 8 as follows.

The position detection processing is started when the power supply of the information processing system 1 employing the image processing apparatus 23 shown in FIG. 3 is turned on and the position detection processing is carried out repeatedly thereafter.

It is to be noted that, in the position detection processing, after the power supply of the information processing system 1 has been turned on, the control section 41 controls the light emitting apparatus 21 to radiate light emitted from the LED 21a and the LED 21b alternately to an image taking subject. In addition, the control section 41 also controls the camera 22 to carry out processing repeatedly to supply a first photographing-result image 61 and a second photographing-result image 62 to the image processing apparatus 23.

As shown in the figure, the flowchart begins with a step 51 at which, on the basis of the first photographing-result image 61 and the second photographing-result image 62 which have been received from the camera 22, the binary-converted skin-image generation section 42 generates a binary-converted skin image 64 and supplies the binary-converted skin image 64 to the reference extraction section 43.

Then, at the next step S2, the reference extraction section 43 extracts a reference 81 from the binary-converted skin image 64 received from the binary-converted skin-image generation section 42 and supplies the reference 81 to the mask-image generation section 44.

Subsequently, at the next step S3, the mask-image generation section 44 determines an extraction area like any of the ones shown in the diagrams serving as FIGS. 6A to 6C on the basis of the reference 81 which has been received from the reference extraction section 43. Then, the mask-image generation section 44 generates a mask image used for specifying the extraction area from the entire area of the first photographing-result image 61 or the second photographing-result image 62 and supplies the mask image to the mask processing section 45. In the case of this embodiment, the mask-image generation section 44 generates the mask image from the entire area of the first photographing-result image 61.

Then, at the next step S4, the mask processing section 45 extracts the extraction area specified by the mask image received from the mask-image generation section 44 from the entire area of the first photographing-result image 61 or the second photographing-result image 62. In the case of this embodiment, the mask processing section 45 extracts the extraction area from the entire area of the first photographing-result image 61.

Subsequently, the mask processing section 45 supplies the extracted extraction area to the characteristic-point extraction section 46.

Then, at the next step S5, the characteristic-point extraction section 46 extracts a characteristic point 121 from the extraction area received from the mask processing section 45 and supplies the characteristic point 121 to the control section 41.

Subsequently, at the next step S6, the control section 41 carries out predetermined processing based on the characteristic point 121 which has been received from the characteristic-point extraction section 46. For example, the control section 41 controls a display apparatus shown in none of the figures to move a pointer of the display apparatus to a position located on the screen of the display apparatus as a position corresponding to the characteristic point 121 which has been received from the characteristic-point extraction section 46.

As described above, in the position detection processing, a reference 81 is extracted from a binary-converted skin image 64 generated on the basis of a first photographing-result image 61 and a second photographing-result image 62 and is used as an approximate characteristic point 121. Then, an accurate characteristic point 121 is extracted from an extraction area which is determined on the basis of the reference 81 from the entire area of the first photographing-result image 61 or the second photographing-result image 62. In the case of this typical embodiment, the extraction area is determined on the basis of the reference 81 from the entire area of the first photographing-result image 61.

Thus, in the position detection processing, the characteristic point 121 is typically extracted from an extraction area which is narrower than the entire area of the first photographing-result image 61. As a result, the characteristic point 121 can be extracted faster than a case in which the characteristic point 121 is extracted from the entire area of the first photographing-result image 61.

In addition, in the position detection processing, the characteristic point 121 is extracted from the extraction area determined on the basis of the reference 81 from the entire area of the first photographing-result image 61 or the second photographing-result image 62 to serve as an extraction area from which the characteristic point 121 can be extracted with a high degree of precision in comparison with an operation to extract the characteristic point 121 directly from the binary-converted skin image 64. Thus, it is possible to extract a characteristic point 121 which is more accurate than a characteristic point 121 extracted directly from the binary-converted skin image 64.

In the first embodiment, the characteristic-point extraction section 46 carries out processing to extract a characteristic point 121 from each of the extraction areas 101a to 101c each formed mainly by the tip of a middle finger of the user. However, a plurality of characteristic points can also be extracted from an extraction area.

The size (and the shape) of an extraction area extracted by the mask processing section 45 and supplied to the characteristic-point extraction section 46 vary in accordance with the number of characteristic points to be extracted by the characteristic-point extraction section 46 from the extraction area. For example, the size (and the shape) of an extraction area from which one characteristic point is to be extracted is different from the size (and the shape) of an extraction area from which a plurality of characteristic points are to be extracted.

Figure 9:
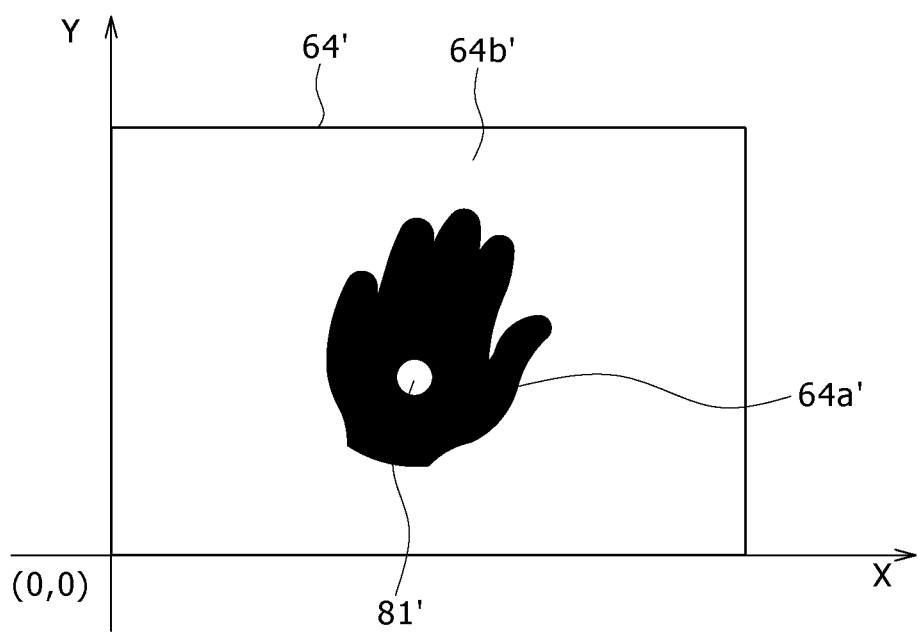
FIG. 9 is an explanatory diagram to be referred to in description of other typical processing carried out by the reference extraction section.
Figure 10:
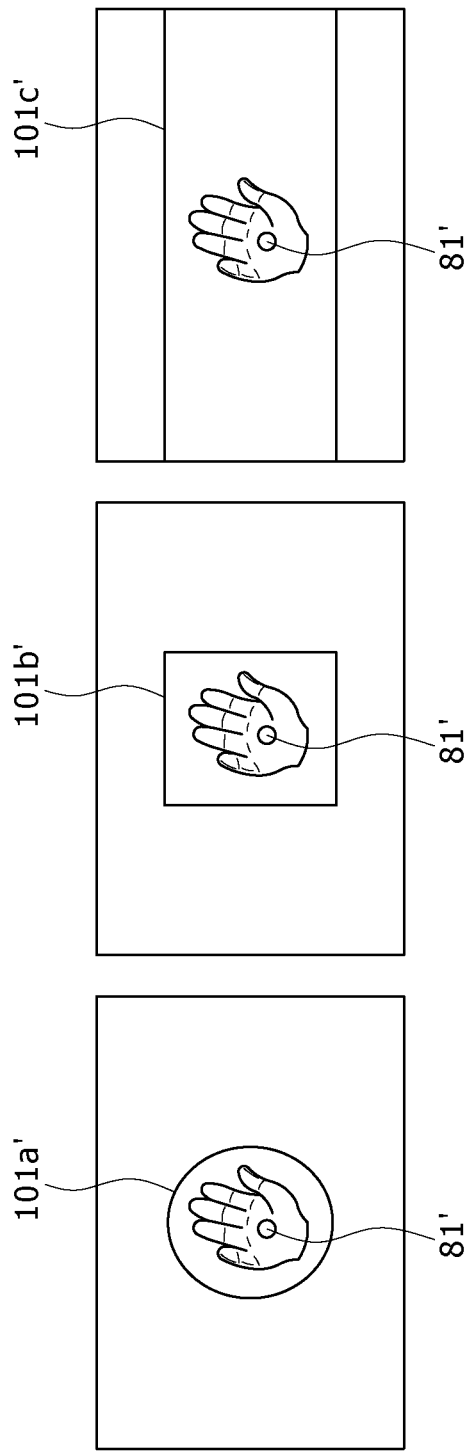
FIGS. 10A to 10C are diagrams each showing another typical mask image.
Figure 11:
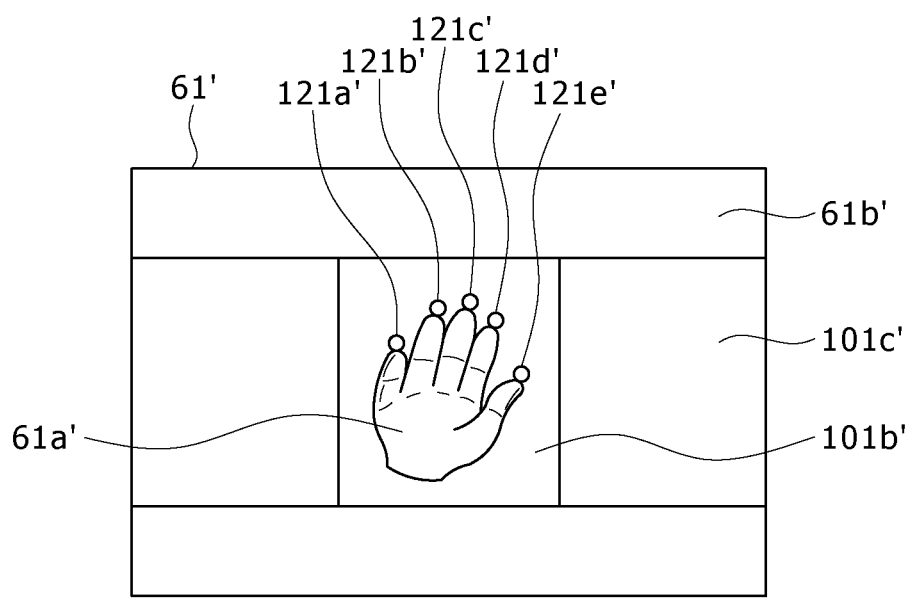
FIG. 11 is an explanatory diagram to be referred to in description of other typical processing carried out by the characteristic-point extraction section.

Next, by referring to FIGS. 9 to 11, the following description explains typical processing carried out by sections ranging from the reference extraction section 43 to the characteristic-point extraction section 46 for a case in which a plurality of characteristic points are extracted from an extraction area.

Figure 6:
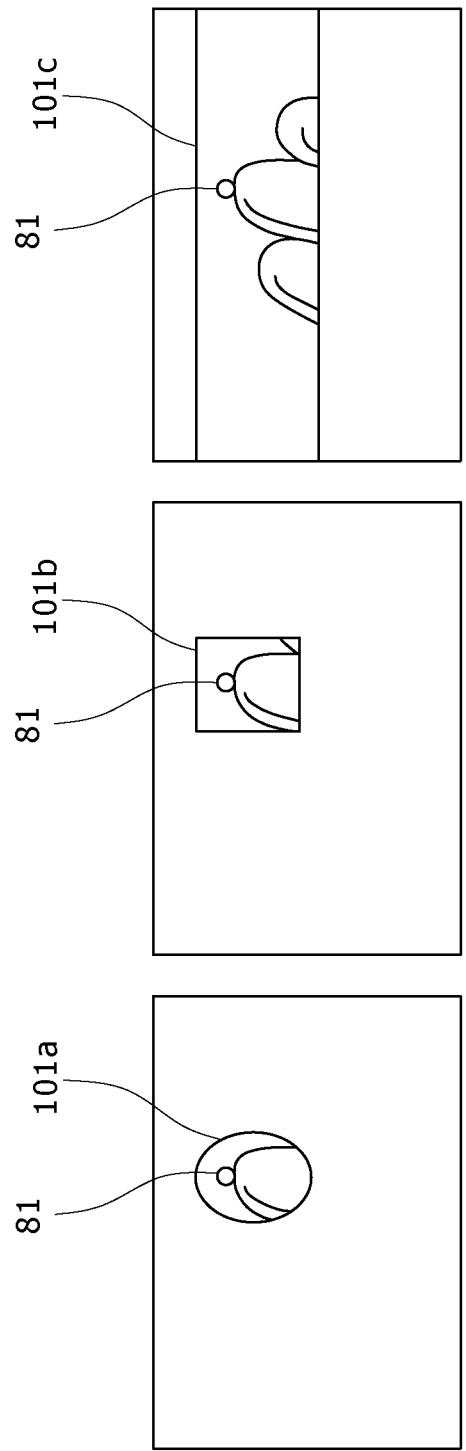
FIGS. 6A to 6C are diagrams each showing a typical mask image.
Figure 7:
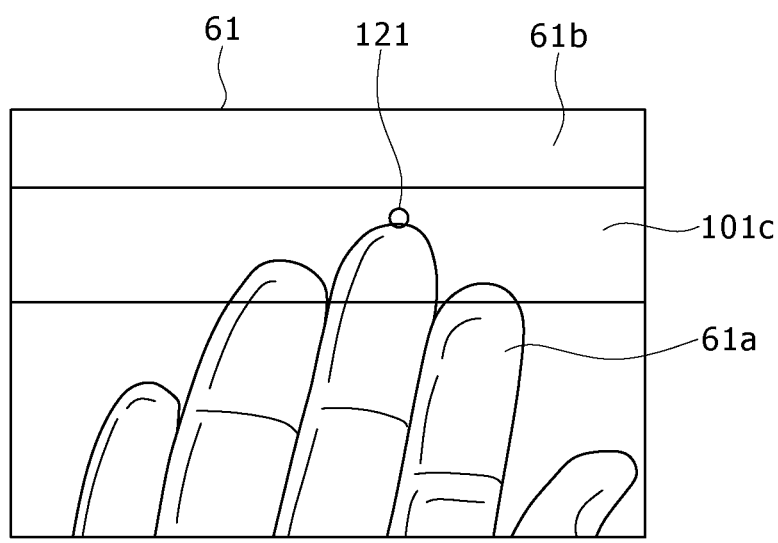
FIG. 7 is a diagram showing typical processing carried out by a characteristic-point extraction section.

It is to be noted that a single quote mark (') is appended to each of reference numerals shown in FIGS. 9 to 11 in order to distinguish the reference numerals from those shown in FIGS. 5 to 7 respectively. Otherwise, FIGS. 9 to 11 are the same as FIGS. 5 to 7 respectively.

As shown in FIG. 9 for example, the reference extraction section 43 extracts the gravity center of the skin area 64a' in the binary-converted skin image 64' received from the binary-converted skin-image generation section 42 as a reference 81' and supplies the reference 81' to the mask-image generation section 44. In the figure, the skin area 64a' is shown in a black color.

On the basis of the reference 81' received from the reference extraction section 43, the mask-image generation section 44 determines an extraction area from the entire area of the first photographing-result image obtained as a result of an image taking operation. Then, the mask-image generation section 44 generates a mask image used for specifying the determined extraction area.

That is to say, as shown in FIG. 10A for example, on the basis of the reference 81' received from the reference extraction section 43, the mask-image generation section 44 determines an area 101a' as an extraction area. The area 101a' has typically an elliptical (or circular) shape including the reference 81'. Typically, the gravity center of the area 101a' having the elliptical (or circular) shape coincides with the reference 81'. Then, the mask-image generation section 44 generates a mask image used for specifying the determined extraction area.

In addition, as an alternative, as shown in FIG. 10B for example, on the basis of the reference 81' received from the reference extraction section 43, the mask-image generation section 44 determines an area 101b' as an extraction area. The area 101b' has typically a rectangular shape including the reference 81'. Typically, the gravity center of the area 101b' having the rectangular shape coincides with the reference 81'. Then, the mask-image generation section 44 generates a mask image used for specifying the determined extraction area.

It is to be noted that, in addition to the area 101a' having an elliptical shape as shown in FIG. 10A and the area 101b' having a rectangular shape as shown in FIG. 10B, on the basis of the reference 81' received from the reference extraction section 43, the mask-image generation section 44 may determine an area with any size and any shape such as a triangular or pentagonal shape as an extraction area.

On top of that, as another alternative, as shown in FIG. 10C for example, on the basis of the reference 81' received from the reference extraction section 43, the mask-image generation section 44 determines an area 101c' as an extraction area. The area 101c' including the reference 81' is composed of a plurality of horizontal lines each oriented in the direction of the X axis. In the figure, the direction of the X axis is the horizontal direction. Then, the mask-image generation section 44 generates a mask image used for specifying the determined extraction area.

To put it concretely, as shown in FIG. 10C for example, on the basis of the reference 81' received from the reference extraction section 43, the mask-image generation section 44 determines an area 101c' as an extraction area. The area 101c' including the reference 81' is composed of a plurality of horizontal lines each oriented in the direction of the X axis. The horizontal lines are provided between an uppermost horizontal line separated away from the reference 81' received from the reference extraction section 43 in the positive direction of the Y axis by a distance determined in advance and a lowermost horizontal line separated away from the reference 81' in the negative direction of the Y axis by a distance determined in advance. Then, the mask-image generation section 44 generates a mask image used for specifying the determined extraction area.

The mask-image generation section 44 supplies the generated mask image to the mask processing section 45.

In the following description, it is assumed that, on the basis of the reference 81' received from the reference extraction section 43, the mask-image generation section 44 determines an area 101c' as an extraction area and, then, the mask-image generation section 44 generates a mask image used for specifying the determined extraction area.

The mask processing section 45 extracts the extraction area 101c' specified by the mask image supplied by the mask-image generation section 44 from the entire area of the first photographing-result image supplied by the camera 22. Then, the mask processing section 45 supplies the extraction area 101c' to the characteristic-point extraction section 46.

It is to be noted that, if the mask processing section 45 extracts a relatively large extraction area 101c', it is quite within the bounds of possibility that the skin area 61a' is accommodated in the extraction area 101c' even if the user moves its hand.

Thus, for example, from a plurality of first photographing-result images obtained as a result of image taking operations carried out by making use of the camera 22, the mask processing section 45 extracts a plurality of extraction areas 101c having the same size and the same shape and supplies the extraction areas 101c to the characteristic-point extraction section 46.

In this case, the mask-image generation section 44 may supply only one mask image for the plurality of first photographing-result images to the mask processing section 45. Thus, in comparison with, for example, a configuration in which, for every first photographing-result image supplied to the mask processing section 45, the mask-image generation section 44 generates a mask image for the photographing-result image and supplies the mask image to the mask processing section 45, the amount of processing carried out by sections ranging from the binary-converted skin-image generation section 42 to the mask-image generation section 44 is small so that characteristic points can be obtained at a high speed.

From an extraction area 101c' shown in FIG. 11 as the extraction area 101c' received from the mask processing section 45, for example, the characteristic-point extraction section 46 extracts the positions at which the fingertips of the five fingers of the right hand of the user are located as a plurality of characteristic points, i.e., characteristic points 121a' to 121e' and supplies the characteristic points 121a' to 121e' to the control section 41.

In this case, when the mask-image generation section 44 generates a mask image, which is used for specifying an area 101b' as an extraction area, on the basis of a reference 81' received from the reference extraction section 43, the mask processing section 45 supplies an extraction area 101b' shown in FIG. 11 to the characteristic-point extraction section 46.

Then, the characteristic-point extraction section 46 extracts typically a plurality of characteristic points, i.e., characteristic points 121a' to 121e' from an extraction area 101b' shown in FIG. 11 as the extraction area 101b' supplied by the mask processing section 45 and supplies the characteristic points 121a' to 121e' to the control section 41.

As described above, if the extraction area 101b' smaller than the extraction area 101c' is used as an extraction area from which characteristic points are to be extracted, in comparison with a case in which the extraction area 101c' is used, the characteristic points 121a' to 121e' can be extracted at a high speed. In addition, since the extraction area is narrow and things other than the hands of the user exist not in large numbers, it is possible to avoid a situation in which the position of a thing other than the fingertips of the fingers of the hands of the user is undesirably extracted as a characteristic point. What is described above can be said to also hold true for a case in which the extraction area 101a' is used.

It is to be noted that the characteristic-point extraction section 46 can be set to adopt an extraction method capable of extracting characteristic points at a higher speed in accordance with factors such as the shape (and the size) of the skin area 61a' from which characteristic points are to be extracted as well as the number of characteristic points to be extracted.

That is to say, for example, when the characteristic-point extraction section 46 extracts the characteristic points 121a' to 121e' from the skin area 61a' representing the whole right hand of the user as shown in FIG. 11, it is desirable to have the characteristic-point extraction section 46 adopt a characteristic-point extraction method based on the thinning algorithm. To put it concretely, for example, it is desirable to have for example the characteristic-point extraction section 46 apply the thinning process (or the backbone process) to a user hand represented by the skin area 61a' on the extraction area 101c' and adopt an extraction method for extracting every fingertip of a user hand to which the thinning process has been applied as a characteristic point. Also in this case, however, it is possible to extract a characteristic point by adoption of a method such as a shape comparison technique for comparison with the fingertip model like the one described before.

On the basis of the characteristic points $121a'$ to $121e'$ received from the characteristic-point extraction section 46, the control section 41 recognizes the condition (such as the movement and the posture) of the user. That is to say, as a movement of the user, the control section 41 determines whether or not the user is making an attempt to squeeze the right hand of the user, try to open the right hand or make another movement. In addition, as a posture of the user, the control section 41 determines whether or not the shape of the right hand of the user is the shape of an opened right hand or recognizes another posture.

In addition, on the basis of a result of the recognition of the condition (such as the movement and the posture) of the user, the control section 41 carries out processing determined in advance.

In the case of the first embodiment, the extraction areas $101a$ to $101c$ are determined on the basis of the reference 81. However, the size (and the shape) of each of the extraction areas $101a$ to $101c$ is by no means limited to those of these typical extraction areas $101a$ to $101c$. In addition, as the reference 81, a position roughly showing the fingertip of a middle finger of the user is typically used. However, it is also possible to make use of a reference 81 allowing each of the extraction areas $101a$ to $101c$ to be determined with ease in accordance the size (and the shape) of each of the extraction areas $101a$ to $101c$ respectively. These statements can be said to also hold true as well for the reference $81'$ and the extraction areas $101a'$ to $101c'$.

In addition, in accordance with the second embodiment, the extraction areas $101a'$ to $101c'$ are determined on the basis of the reference $81'$. However, the method for determining the extraction areas $101a'$ to $101c'$ is by no means limited to the method described above.

Figure 12:
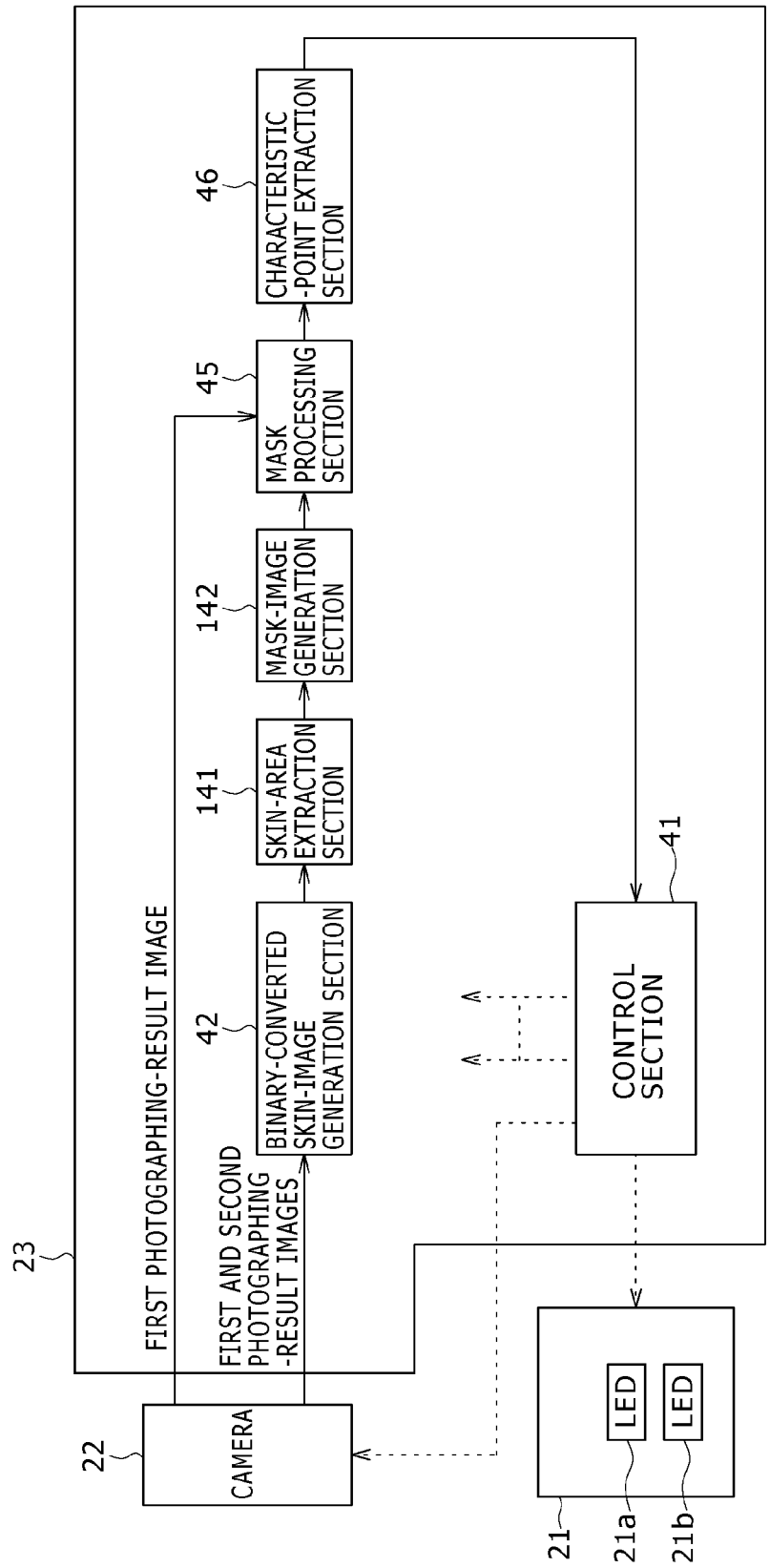
FIG. 12 is a block diagram showing another typical detailed configuration of the image processing apparatus.
Figure 13:
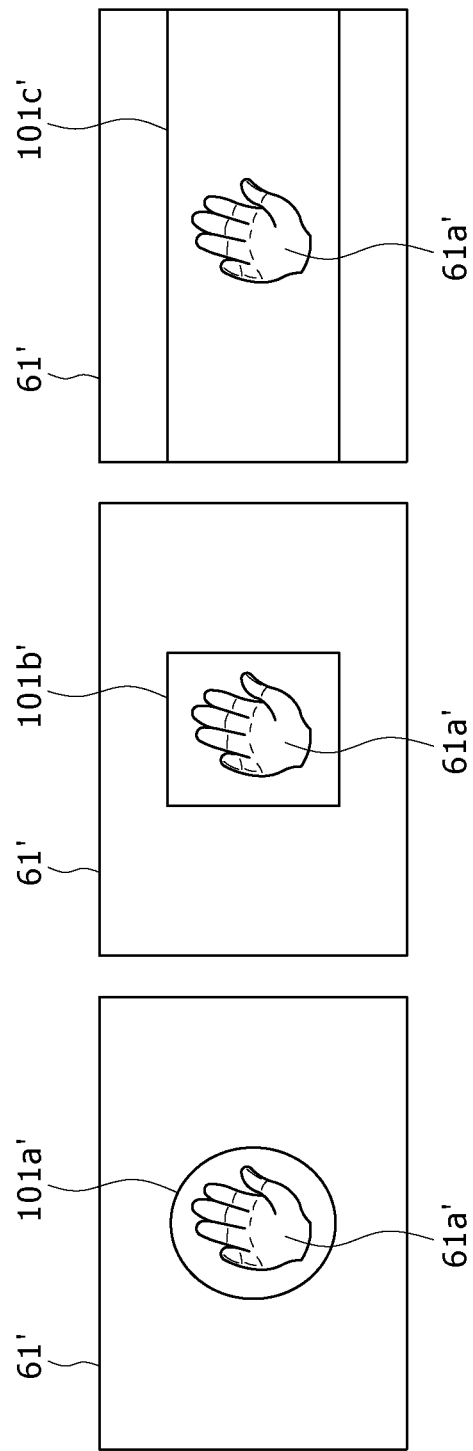
FIGS. 13A to 13C are diagrams each showing a further typical mask image.
Figure 14:
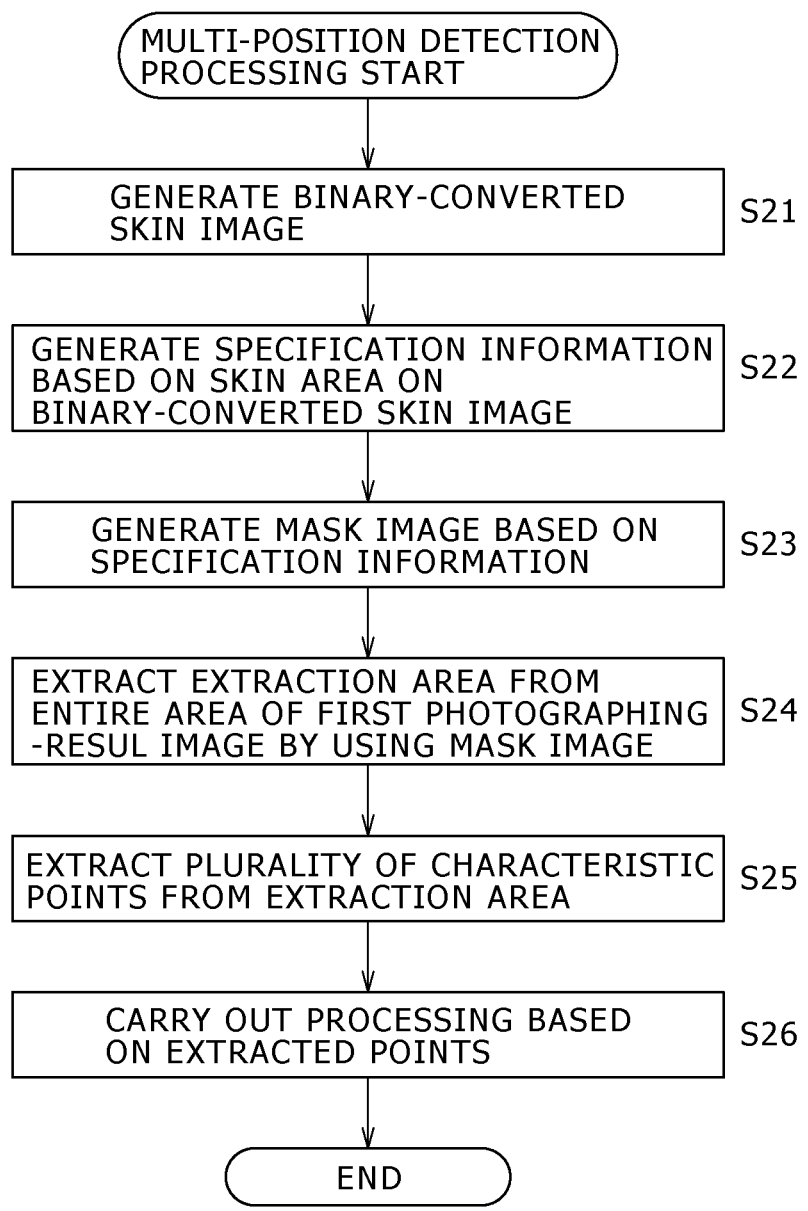
FIG. 14 shows an explanatory flowchart representing multi-position detection processing carried out by an information processing system employing the image processing apparatus shown in FIG. 12.

Next, by referring to FIGS. 12 to 14, the following description explains the image processing apparatus 23 for a case in which the skin area $61a'$ on the first photographing-result image $61'$ is roughly detected on the basis of the skin area $64a'$ on the binary-converted skin image $64'$ and such extraction areas $101a'$ to $101c'$ are determined to include the detected entire skin area $61a'$.

2. Second Embodiment

Typical Configuration of the Image Processing Apparatus

FIG. 12 is a block diagram showing another typical detailed configuration the image processing apparatus 23.

It is to be noted that, in the image processing apparatus 23 shown in FIG. 12, components having configurations identical with the configurations of their respective counterparts employed in the image processing apparatus 23 shown in FIG. 3 are denoted by the same reference numerals as the counterparts, and explanations of the components having configurations identical with the configurations of their respective counterparts are properly omitted from the following description.

That is to say, the image processing apparatus 23 shown in FIG. 12 employs a skin-area extraction section 141 and a mask-image generation section 142 in place of respectively the reference extraction section 43 and the mask-image generation section 44 which are employed in the image processing apparatus 23 shown in FIG. 3. The other components employed in the image processing apparatus 23 shown in FIG. 12 have configurations identical with the configurations of their respective counterparts employed in the image processing apparatus 23 shown in FIG. 3.

The skin-area extraction section 141 extracts a skin area $64a'$ from the binary-converted skin image $64'$ supplied by the binary-converted skin-image generation section 42. Then, the skin-area extraction section 141 generates specification information used for specifying an area (which is an approximate skin area $61a'$) included in the first photographing-result image $61'$ to serve as a skin area $61a'$ corresponding to the skin area $64a'$ on the basis of the skin area $64a'$ extracted from the binary-converted skin image $64'$. Subsequently, the skin-area extraction section 141 supplies the specification information to the mask-image generation section 142.

It is to be noted that, in the following description, in order to distinguish the skin area $64a'$ included in the binary-converted skin image $64'$ to represent the existence of a skin of the user from the skin area $61a'$ included in the first photographing-result image $61'$ as an area exposed to a skin of the user, the skin area $61a'$ on the first photographing-result image $61'$ is also referred to as a skin exposure area $61a'$.

On the basis of the specification information received from the skin-area extraction section 141, the mask-image generation section 142 identifies a partial area including an approximate skin exposure area $61a'$ (that is, an approximate skin area $61a'$) specified by the specification information from the entire area of the first photographing-result image $61'$ and takes the identified partial area as an extraction area. Then, the mask-image generation section 142 generates a mask image to be used for specifying the extraction area determined from the entire area of the first photographing-result image $61'$.

To put it concretely, the mask-image generation section 142 identifies an elliptical area $101a'$ including the skin exposure area $61a'$ from the first photographing-result image $61'$ as shown in FIG. 13A and determines the elliptical extraction area $101a'$ as an extraction area. Then, the mask-image generation section 142 generates a mask image to be used for specifying the determined extraction area $101a'$.

In addition, the mask-image generation section 142 identifies a rectangular area $101b'$ including the skin exposure area $61a'$ from the first photographing-result image $61'$ as shown in FIG. 13B and determines the identified rectangular extraction area $101b'$ as an extraction area. Then, the mask-image generation section 142 generates a mask image to be used for specifying the determined extraction area $101b'$.

It is to be noted that the mask-image generation section 142 may determine an area having any other shape and any other size to include the skin exposure area $61a'$ as an extraction area. The other shape of the determined area is a shape other than the elliptical shape of the extraction area $101a'$ shown in FIG. 14A and the rectangular shape of the extraction area $101b'$ shown in FIG. 14B. Typical examples of the other shape are a triangular shape and a pentagonal shape.

On top of that, as shown in FIG. 13C for example, the mask-image generation section 142 determines an area $101c'$ from the first photographing-result image $61'$ as an extraction area. The extraction area $101c'$ including the skin exposure area $61a'$ is composed of a plurality of horizontal lines each oriented in the direction of the X axis. In the figure, the direction of the X axis is the horizontal direction. Then, the mask-image generation section 142 generates a mask image used for specifying the determined extraction area $101c$.

To put it in detail, as shown in FIG. 13C for example, the mask-image generation section 142 determines an area $101c'$ from the first photographing-result image $61'$ as an extraction area. The extraction area $101c'$ is composed of a plurality of horizontal lines each oriented in the direction of the X axis. The horizontal lines are provided between an uppermost horizontal line separated away from the upper edge of an area specified by the specification information in the positive direction of the Y axis by a distance determined in advance and a lowermost horizontal line separated away from the lower edge of the area specified by the specification information in the negative direction of the Y axis by a distance determined in advance. Then, the mask-image generation section 142 generates a mask image used for specifying the determined extraction area 101c'.

The mask-image generation section 142 supplies the generated mask image to the mask processing section 45.

The mask processing section 45 selects typically the extraction area 101c' from the extraction area 101a', the extraction area 101b' and the extraction area 101c' which have been determined from the first photographing-result image 61' supplied by the camera 22 and extracts the selected extraction area 101c' from the first photographing-result image 61'. Then, the mask processing section 45 supplies the extracted extraction area 101c' to the characteristic-point extraction section 46.

Subsequently, as shown in FIG. 11, the characteristic-point extraction section 46 extracts a plurality of characteristic points, i.e., the characteristic points 121a' to 121e' on the skin exposure area 61a' from the extraction area 101c' which has been supplied by the mask processing section 45. Then, the characteristic-point extraction section 46 supplies the characteristic points 121a' to 121e' to the control section 41.

Details of Multi-Position Detection Processing Carried Out by the Information Processing System Next, by referring to a flowchart shown in FIG. 14, the following description explains details of multi-position detection processing carried out by the information processing system 1 including the image processing apparatus 23 shown in FIG. 12.

The multi-position detection processing is typically carried out repeatedly after the power supply of the information processing system 1 including the image processing apparatus 23 shown in FIG. 12 is turned on. It is to be noted that, in the multi-position detection processing, in response to an operation to turn on the power supply of the information processing system 1, the control section 41 controls the light emitting apparatus 21 in order to drive the LEDs 21a and 21b to emit light alternately. In addition, the control section 41 also repeatedly carries out processing to control the camera 22 to supply a first photographing-result image and a second photographing-result image which have been obtained as a result of image taking operations to the image processing apparatus 23 shown in FIG. 12.

The flowchart begins with a step S21 at which, on the basis of first and second photographing-result images received from the camera 22, the binary-converted skin-image generation section 42 generates a binary-converted skin image 64' and supplies the binary-converted skin image 64' to the skin-area extraction section 141.

Then, at the next step S22, the skin-area extraction section 141 extracts a skin area 64a' from the binary-converted skin image 64' received from the binary-converted skin-image generation section 42. Subsequently, the skin-area extraction section 141 generates specification information for specifying an area corresponding to the extracted skin area 64a' typically from the entire area of the first photographing-result image 61'. The area corresponding to the extracted skin area 64a' is an approximate skin exposure area 61a'. Then, the skin-area extraction section 141 supplies the specification information to the mask-image generation section 142.

Subsequently, at the next step S23, on the basis of the specification information received from the skin-area extraction section 141, the mask-image generation section 142 identifies a partial area including an area specified by the specification information from the entire area of the first photographing-result image 61' and determines the identified partial area as typically the extraction area 101c'. Then, the mask-image generation section 142 generates a mask image for specifying the extraction area 101c' determined from the entire area of the first photographing-result image 61' and supplies the mask image to the mask processing section 45.

Then, at the next step S24, the mask processing section 45 extracts the extraction area 101c' specified by the mask image received from the mask-image generation section 142 from the entire area of the first photographing-result image 61' which is a typical one of the first and second photographing-result images received from the camera 22.

Subsequently, the mask processing section 45 supplies the extracted extraction area 101c' to the characteristic-point extraction section 46.

Then, at the next step S25, the characteristic-point extraction section 46 extracts a plurality of characteristic points, that is, the characteristic points 121a' to 121e', from the extraction area 101c' received from the mask processing section 45 and supplies the characteristic points 121a' to 121e' to the control section 41.

Subsequently, at the next step S26, the control section 41 carries out predetermined processing based on the extracted characteristic points 121a' to 121e' received from the characteristic-point extraction section 46. That is to say, for example, on the basis of the characteristic points 121a' to 121e' received from the characteristic-point extraction section 46, the control section 41 identifies the shape of a hand of the user and, on the basis of results of the hand-shape identification, the control section 41 recognizes a gesture made by the user. Then, the control section 41 carries out processing according to the recognized gesture.

As described above, in the multi-position detection processing, the extraction areas 101a' to 101c' are typically determined so as to include all the skin exposure areas 61a' on the first photographing-result image 61'. Then, in a range occupied by the extraction areas 101a' to 101c' as a range smaller than the entire area of the first photographing-result image 61', typically, processing to extract the characteristic points 121a' to 121e' is carried out with the skin exposure areas 61a' each taken as an object of the processing. Thus, in comparison with a case in which the processing is carried out with the entire area of the first photographing-result image 61' taken as an object of the processing, the processing to extract the characteristic points 121a' to 121e' from the skin exposure areas 61a' can be carried out at a high speed.

In the first and second embodiments described above, the characteristic-point extraction section 46 extracts the positions of typically fingertips of the user as characteristic points from an extraction area supplied by the mask processing section 45. However, the characteristic point is by no means limited to the position of a fingertip of the user.

Figure 15:
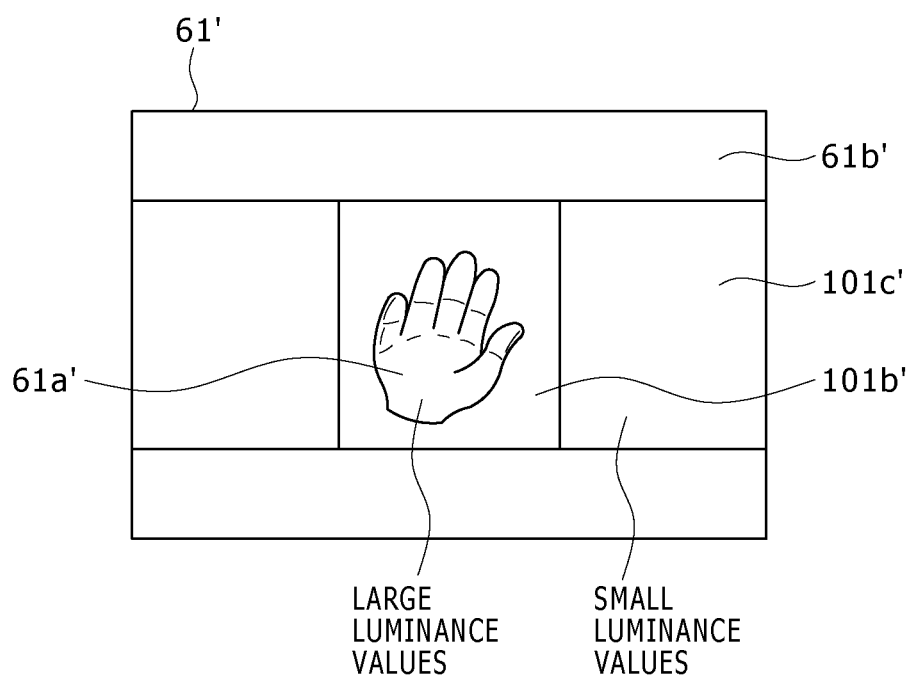
FIG. 15 is an explanatory diagram to be referred to in description of further typical processing carried out by the characteristic-point extraction section.

That is to say, for example, in order to extract the shape of the skin exposure area 61a', as shown in FIG. 15, the characteristic-point extraction section 46 may also extract the positions of pixels composing the skin exposure area 61a' as characteristic points from the extraction area 101c' supplied by the mask processing section 45.

Next, FIG. 15 is given as an explanatory diagram referred to in the following description of further typical processing carried out by the characteristic-point extraction section 46. In this further typical processing, the characteristic-point extraction section 46 extracts pixels composing the skin exposure area 61a' on the first photographing—result image 61' from the extraction area 101c' as characteristic points.

As shown in FIG. 15, the extraction area 101c' is configured to include the skin exposure area 61a' and a non-skin area 61b' other than the skin exposure area 61a'. In the following description, the non-skin area 61b' is also referred to as a non-skin-exposure area 61b'. In addition, it is assumed that the non-skin-exposure area 61b' does not include, among others, a white shirt and a mirror which each have a relatively high reflectance. With such a configuration, there are a number of cases in which a hand of the user is put at a location closest to the light emitting apparatus. Thus, in the extraction area 101c', the luminance values of the skin exposure area 61a' exposed to the hand of the user are relatively high in comparison with the luminance values of the non-skin-exposure area 61b' placed at a location separated away from the light emitting apparatus. It is to be noted that a later description will explain a case in which the non-skin-exposure area 61b' includes, among others, a white shirt and a mirror which each have a relatively high reflectance.

Thus, the characteristic-point extraction section 46 extracts the positions of pixels having luminance values not smaller than a first luminance threshold value as characteristic points from an extraction area 101c' supplied by the mask processing section 45. It is to be noted that the first luminance threshold value is a value determined on the basis of a distribution of luminance values for the skin exposure area 61a'. However, the first luminance threshold value can also be a value determined in advance on the basis of a variety of values including luminance values assumed as luminance values for the skin exposure area 61a' and luminance values assumed as luminance values for the non-skin-exposure area 61b' and stored in typically a memory employed in the characteristic-point extraction section 46. This memory itself is shown in none of the figures.

Then, the characteristic-point extraction section 46 supplies an area composed of a plurality of detected characteristic points to the control section 41 as a skin exposure area 61a'.

In this case, the characteristic-point extraction section 46 compares a skin area 64a' detected on the basis of a first photographing-result image taken at a specific image taking time with a skin area 64a' detected on the basis of a second photographing-result image taken at another image taking time different from the specific image taking time. That is to say, the characteristic-point extraction section 46 compares a specific area 64a' of a skin exposure area on the first photographing-result image with another area 64a' included in a skin exposure area on the second photographing-result image as another area 64a' overlapping the specific area 64a'. By such comparison, the characteristic-point extraction section 46 is capable of extracting the shape of the skin exposure area 61a' on the first photographing-result image 61' with a higher degree of accuracy.

That is to say, for example, the binary-converted skin-image generation section 42 takes an overlapping area as a skin area on a binary-converted skin image. In this case, the overlapping area is an overlap of a skin exposure area on a first photographing-result image output by the camera 22 on another skin exposure area on a second photographing-result image output by the camera 22.

The first photographing-result image is taken by the camera 22 at a specific image taking time whereas the second photographing-result image is taken by the camera 22 at another image taking time different from the specific image taking time. Thus, in some cases, the position of the skin exposure area on the first photographing-result image completely disagrees with the position of the skin exposure area on the second photographing-result image.

In such cases, the shape of the skin area on the binary-converted skin image generated by the binary-converted skin-image generation section 42 is different from the shape of the skin exposure area on the first photographing-result image.

On the other hand, the characteristic-point extraction section 46 extracts an area as a skin exposure area 61a' shown in FIG. 15. The extracted area is composed of pixels having luminance values not smaller than a luminance threshold value determined in advance from an extraction area 101c' supplied by the mask processing section 45.

Thus, even if the first photographing-result image is taken at a specific image taking time whereas the second photographing-result image is taken at another image taking time different from the specific image taking time, the characteristic-point extraction section 46 is capable of extracting the shape of the skin exposure area 61a' from the first photographing-result image 61' with a higher degree of accuracy.

If the non-skin-exposure area 61b' shown in FIG. 15 includes a high-luminance area having a white shirt and a mirror which each have a relatively high reflectance, in some cases, the luminance values of the skin exposure area 61a' are not greater than the luminance values of the high-luminance area included in the non-skin-exposure area 61b'. (FIG. 15 does not show the high-luminance area). In such cases, in addition to positions in the skin exposure area 61a', positions in the high-luminance area included in the non-skin-exposure area 61b' may also be extracted inadvertently as characteristic points.

In order to solve the above problem, for example, the extraction area 101b' shown in FIG. 15 is taken as an extraction area smaller than the extraction area 101c' so that the extraction area does not include the high-luminance area of the non-skin-exposure area 61b'. In this case, positions in the high-luminance area included in the non-skin-exposure area 61b' can be prevented from being extracted inadvertently as characteristic points. This solution can also be applied to a case in which the extraction area 101a' is used.

In addition, the skin exposure area 61a' and the high-luminance area included in the non-skin-exposure area 61b' can be distinguished from each other due to the fact that the luminance values of the skin exposure area 61a' do not match the luminance values of the high-luminance area included in the non-skin-exposure area 61b'.

That is to say, for example, the skin-area extraction section 141 supplies specification information to be used for specifying an approximate skin exposure area 61a' to not only the mask-image generation section 142, but also the characteristic-point extraction section 46. On the basis of the specification information received from the skin-area extraction section 141, the characteristic-point extraction section 46 detects the approximate skin exposure area 61a' from the extraction area 101c' received from the mask processing section 45.

In addition, the characteristic-point extraction section 46 computes the average of pixel values of the detected approximate skin exposure area 61a'. Then, the characteristic-point extraction section 46 selects specific pixels from pixels on the extraction area 101c' and extracts the positions of the selected specific pixels from the extraction area 101c' as characteristic points. In this case, the specific pixels selected by the characteristic-point extraction section 46 from the pixels on the extraction area 101c' meet the following requirement: The absolute difference between the luminance value of every specific pixel and the computed average of luminance values does not greater than a second luminance threshold value.

It is to be noted that the second luminance threshold value is a value determined on the basis of a distribution of luminance values for the skin exposure area 61a'. However, the second luminance threshold value can also be a value determined in advance on the basis of a variety of values including a value assumed as the average of luminance values for the skin exposure area 61a', luminance values assumed as luminance values for the skin exposure area 61a' and luminance values assumed as luminance values for the high-luminance area and stored in typically a memory employed in the characteristic-point extraction section 46. This memory itself is shown in none of the figures.

According to the method described above, characteristic points to be extracted are determined in accordance with whether or not the absolute difference is equal to or smaller than the second luminance threshold value. This method can be applied to not only the extraction area 101c', but also the extraction area 101a' and the extraction area 101b'.

3. Modified Versions

In the first embodiment described above, the characteristic-point extraction section 46 typically extracts a tip of a skin area on the first photographing-result image 61 and makes use of the tip as a characteristic point 121. For example, the characteristic-point extraction section 46 extracts the tip of a user middle finger for example, on the first photographing-result image 61 and makes use of the tip as a characteristic point 121. However, it is also possible to provide a configuration in which a new characteristic point is obtained by, for example, shifting the extracted the characteristic point 121 by an offset in a direction toward the inner side of skin area on the first photographing-result image 61 and used as the eventual characteristic point 121. In this way, for example, the middle portion of the middle finger can be used as the eventual characteristic point 121.

In addition, in the first embodiment described above, the characteristic-point extraction section 46 extracts the position of the tip of a middle finger of the user as the characteristic point 121. However, it is also possible to provide a configuration in which the characteristic-point extraction section 46 extracts any other arbitrary position such as the position of the tip of a forefinger of the user as the characteristic point 121.

On top of that, in the first embodiment described above, the mask-image generation section 44 determines the area 101c like the one shown in the diagram serving as FIG. 6C to serve as the extraction area. However, it is also possible to provide a configuration in which the mask-image generation section 44 determines an extraction area typically in accordance with the shape of the image taking subject which exists on the first photographing-result image 61 and the second photographing-result image 62.

That is to say, if the image taking subject has a round shape for example, the mask-image generation section 44 determines the area 101a having an elliptical shape like the one shown in the diagram serving as FIG. 6A to serve as the extraction area. If the image taking subject has a rectangular shape, on the other hand, the mask-image generation section 44 determines the area 101b having a rectangular shape like the one shown in the diagram serving as FIG. 6B to serve as the extraction area.

In the case of this configuration, in accordance with the shape of the image taking subject, the mask-image generation section 44 is allowed to determine an extraction area with a smallest required size as an extraction area from which a characteristic point 121 is to be extracted. Thus, the characteristic-point extraction section 46 is capable of carrying out the processing to extract the characteristic point 121 from the extraction area determined by the mask-image generation section 44 in a shorter period of time. This holds true in the case of the second embodiment.

In addition, in the first embodiment described above, the reference extraction section 43 provides the mask-image generation section 44 with the coordinates $(x, y_{max})$ as they are to be used as the coordinates of the reference 81 shown in the diagram which serves as FIG. 5. If the skin area 64a has a plurality of points each having the coordinates $(x, y_{max})$, the reference extraction section 43 selects a point having coordinates $(x_{max}, y_{max})$ among the points each having the coordinates $(x, y_{max})$ and takes the selected point having the coordinates $(x_{max}, y_{max})$ as the reference 81, supplying the coordinates of the reference 81 to the mask-image generation section 44. However, information output by the reference extraction section 43 to serve as information on the reference 81 is by no means limited to the coordinates $(x, y_{max})$ and the coordinates $(x_{max}, y_{max})$. That is to say, it is also possible to provide a configuration in which the reference extraction section 43 provides the mask-image generation section 44 with any kind of information as long as the information can be used by the mask-image generation section 44 to uniquely identify the point having the coordinates $(x, y_{max})$ or the coordinates $(x_{max}, y_{max})$.

On top of that, in the first embodiment described above, the binary-converted skin-image generation section 42 generates a binary-converted skin image 64 by converting the difference image 63 as it is. That is to say, the binary-converted skin-image generation section 42 converts the difference image 63 into a binary-converted skin image 64 without processing the difference image 63 prior to the conversion. As described before, the difference image 63 is generated on the basis of a first photographing-result image 61 and a second photographing-result image 62 which are provided by the camera 22. However, it is also possible to provide a configuration in which the binary-converted skin-image generation section 42 generates a binary-converted skin image 64 by conversion of the difference image 63 into the binary-converted skin image 64 after normalizing every individual one of pixels composing the difference image 63 by making use of the luminance value of a pixel included in the first photographing-result image 61 to serve as a pixel corresponding to the individual pixel. In the normalization, the pixel value of every individual pixel on the difference image 63 is typically divided by the luminance value of a pixel included in the first photographing-result image 61 to serve as a pixel corresponding to the individual pixel. It is to be noted that the binary-converted skin-image generation section 42 may also normalize the difference image 63 by making use of the second photographing-result image 62 in place of the first photographing-result image 61 prior to the conversion of the difference image 63 into a binary-converted skin image 64.

In addition, the binary-converted skin-image generation section 42 is also capable of normalizing the luminance value of every pixel composing the difference image 63 by making use of an average value of the first photographing-result image 61 and the second photographing-result image 62 and, after the normalization processing, carrying out the processing to convert the difference image 63 into a binary-converted skin image 64.

That is to say, the binary-converted skin-image generation section 42 is also capable of normalizing the luminance value of every pixel composing the difference image 63 by making use of a value based on at least either the luminance values of pixels composing the first photographing-result image 61 or the luminance values of pixels composing the second photographing-result image 62 and, after the normalization processing, carrying out the processing to convert the difference image 63 into a binary-converted skin image 64.

Since a threshold value used in the processing to convert the difference image 63 into a binary-converted skin image 64 after the difference image 63 has been normalized can be a constant, the conversion process can be carried out at a higher speed.

In the first embodiment, the absolute value of a difference obtained as a result of subtracting the luminance value of a pixel composing the second photographing-result image 62 from the luminance value of a corresponding pixel composing the first photographing-result image 61 is used as the luminance value of a corresponding pixel composing the difference image 63. However, the difference image 63 having such an absolute difference as the luminance value of a pixel is not a mandatory image.

That is to say, for example, it is known that, the larger the wavelength of light incident to a hair of a human being, the larger the reflectance of the hair. If an application to distinguish a skin and a hair from each other with a high degree of accuracy is taken into consideration, it is desirable to make use of the absolute difference as the luminance value of a pixel composing the difference image 63 as it is.

In this case, the binary-converted skin-image generation section 42 can be controlled to make use of the absolute difference as the luminance value of a pixel composing the difference image 63 as it is. Also in this case, similarly, after the binary-converted skin-image generation section 42 normalizes the difference image 63 by making use of the absolute differences as the luminance values of pixels composing the difference image 63, the binary-converted skin-image generation section 42 carries out the processing to convert the normalized difference image 63 into a binary-converted skin image 64.

In addition, for example, the binary-converted skin-image generation section 42 may generate a ratio image to replace the difference image 63. In this case, for each pixel composing the ratio image, the binary-converted skin-image generation section 42 normalizes the generated ratio image by making use of the ratio of the luminance value of the corresponding pixel composing the first photographing-result image 61 to the luminance value of a corresponding pixel composing the second photographing-result image 62 as the luminance value of the pixel composing the ratio image. Then, the binary-converted skin-image generation section 42 carries out the processing to convert the normalized ratio image into a binary-converted skin image 64. Also in this case, a threshold value used in the processing to convert the ratio image into a binary-converted skin image 64 after the ratio image has been normalized can be a constant.

In the first and second embodiments, with the first photographing-result image 61 assumed to include only one skin exposure area (or one skin area) in order to simplify the explanations, processing is carried out to extract a characteristic point from an extraction area including the entire skin exposure area or a portion of the skin exposure area.

Even if the first photographing-result image 61 includes a plurality of skin exposure areas, however, the processing can also be carried out to extract a characteristic point from any of the skin exposure areas.

That is to say, for example, if the first photographing-result image 61 includes a plurality of skin exposure areas, any one of the skin exposure areas is selected and taken as an observed skin exposure area. Then, the processing can be carried out to extract a characteristic point from the observed skin exposure area. In this case, the skin exposure area taken as an observed skin exposure area is typically an area having a size ranked ith from the top among the skin exposure areas. As another example, the skin exposure area taken as an observed skin exposure area can be conceivably an area having an average luminance value ranked jth from the top among the skin exposure areas. As a further example, the skin exposure area taken as an observed skin exposure area can be conceivably an area having a maximum (or minimum) luminance value ranked jth from the top (or bottom) among the skin exposure areas.

To put it concretely, for example, the skin exposure area taken as an observed skin exposure area is an area having a largest size ranked first among the skin exposure areas. As another example, the skin exposure area taken as an observed skin exposure area is an area having a largest average luminance value ranked first among the skin exposure areas.

This is because, when the user moves its own hand in order to operate the information processing system 1 to carry out processing determined in advance, the user generally moves the hand in a state of being close to the camera 22 (and the light emitting apparatus 21) of the information processing system 1 in comparison with the face and the body.

Here, as a particular example, the observed skin exposure area is determined on the basis of the average of luminance values of pixels composing every skin exposure area. In this case, a desired skin exposure area can be selected from a plurality of skin exposure areas and taken as the observed skin exposure area.

That is to say, for example, in the first photographing-result image 61, a hand and the face are superposed on each other so that a portion of the face is hidden behind the hand. In this case, even if a first skin exposure area for the hand and a second skin exposure area for the face are joined to each other, forming a contiguous area, the a first skin exposure area can be taken as the observed skin exposure area.

To put it concretely, for example, the first skin exposure area can be distinguished clearly from an area formed by joining the first and second skin exposure areas to each other on the basis of a difference in luminance-value average between the first and second skin exposure areas and taken as the observed skin exposure area.

As another example, a skin exposure area with a smallest sum (i+j) among a plurality of skin exposure areas is selected from the skin exposure areas and taken as the observed skin exposure area. In this case, symbol i denotes an order number in a ranking order set for the sizes of the skin exposure areas. On the other hand, symbol j denotes an order number in a ranking order set for the luminance-value averages each computed for one of the skin exposure areas.

As a further example, if the first photographing-result image 61 includes a plurality of skin exposure areas, the skin exposure areas are sequentially selected on a one-area-after-another basis as the observed skin exposure area and processing is carried out on each skin exposure area taken as the observed skin exposure area.

As a still further example, if the first photographing-result image 61 includes a plurality of skin exposure areas, an extraction area including at least two of the skin exposure areas is determined and processing is carried out on the extraction area.

In the first and second embodiments, the mask processing section 45 extracts an extraction area from the first photographing-result image 61 received from the camera 22. However, an image from which an extraction area is to be extracted is by no means limited to the first photographing-result image 61.

That is to say, for example, an image from which an extraction area is to be extracted can be any extraction-object image as long as the extraction-object image shows the image taking subject. To put it concretely, for example, the mask processing section 45 may extract an extraction area of course from not only the first photographing-result image 61 (or the second photographing-result image 62) received from the camera 22, but also an average image having the luminance value of every pixel thereof equal to the average of the luminance value of the corresponding pixel in the first photographing-result image 61 and the luminance value of the corresponding pixel in the second photographing-result image 62.

In addition, in the first and second embodiments described above, the first wavelength $\lambda 1$ of light emitted by the LED 21a is 870 nm whereas the second wavelength $\lambda 2$ of light emitted by the LED 21b is 950 nm. However, it is also possible to provide a configuration in which the first wavelength $\lambda 1$ and the second wavelength $\lambda 2$ are set into another combination.

That is to say, the first wavelength $\lambda 1$ and the second wavelength $\lambda 2$ can also be set into any other combination as long as the other combination provides such a first wavelength $\lambda 1$ and such a second wavelength $\lambda 2$ that the absolute value of a difference between the reflection ratio exhibited by the skin of the user for the first wavelength $\lambda 1$ and the reflection ratio exhibited by the skin of the user for the second wavelength $\lambda 2$ is sufficiently large in comparison with the absolute value of a difference between the reflection ratio exhibited by an object other than the skin of the user for the first wavelength $\lambda 1$ and the reflection ratio exhibited by the object other than the skin of the user for the second wavelength $\lambda 2$.

To put it more concretely, in addition to the combination of the first wavelength $\lambda 1$ of 870 nm and second wavelength $\lambda 2$ and 950 nm, another combination can also be adopted. As is obvious from the diagram serving as FIG. 2, for example, the other combination can be a combination of the first wavelength $\lambda 1$ of 800 nm and second wavelength $\lambda 2$ and 950 nm, a combination of the first wavelength $\lambda 1$ of 870 nm and second wavelength $\lambda 2$ and 1,000 nm or a combination of the first wavelength $\lambda 1$ of 800 nm and second wavelength $\lambda 2$ and 1,000 nm. In any of the combinations described above, the first wavelength $\lambda 1$ of light emitted by the LED 21a is less than 930 nm whereas the second wavelength $\lambda 2$ of light emitted by the LED 21b is equal to or not less than 930 nm.

It is to be noted that, from experiments conducted by inventor of the present application, the following fact is known. In order to detect a skin area with a high degree of accuracy, it is desirable to set the first wavelength $\lambda 1$ approximately in the range 640 nm to 1,000 nm and the second wavelength $\lambda 2$ on a wavelength side greater than the first wavelength $\lambda 1$ approximately in the range 900 nm to 1,100 nm.

In particular, for example, by setting the value of the first wavelength $\lambda 1$ in a near infrared range of 700 nm to 1,000 nm excluding the range of visible light, each of the LED 21a and the LED 21b emits invisible light such as the infrared light to the image taking subject. In this case, without letting the image taking subject which is the operator of the information processing system 1 feel excessive brightness, the gesture (and the posture) of the operator can be recognized.

It is to be noted that, if the LED 21a emits visible light, in place of the visible-light cut filter 22a, the information processing system 1 makes use of a filter that passes on only the visible light emitted by the LED 21a to the lens employed in the camera 22. Such a filter is also used to replace the visible-light cut filter 22a if the LED 21b emits visible light.

On top of that, in the first and second embodiments described above, the light emitting apparatus 21 drives each of the LED 21a and the LED 21b to emit light individually at different times. However, it is also possible to provide a configuration in which the light emitting apparatus 21 drives each of the LED 21a and the LED 21b to emit light at the same time. In such a configuration, the first photographing-result image 61 and the second photographing-result image 62 can also be obtained at the same time as well.

To put it more concretely, for example, in place of the camera 22, two cameras each having the same function as the camera 22 are used. On the front surface of a specific one of the two cameras, a filter for passing only light with the first wavelength $\lambda 1$ is provided. On the front surface of the other camera, on the other hand, a filter for passing only light with the second wavelength $\lambda 2$ is provided.

In the configuration described above, even if the light emitting apparatus 21 drives each of the LED 21a and the LED 21b to emit light at the same time, the specific camera receives only the light with the first wavelength $\lambda 1$ so that the specific camera generates the first photographing-result image 61. By the same token, since the other camera receives only the light with the second wavelength $\lambda 2$, the other camera generates the second photographing-result image 62.

In addition, in the first and second embodiments described above, the number of LEDs included in each of the LED 21a and the LED 21b is two. However, it is by all means possible to provide a configuration in which the number of LEDs is not two.

That is to say, for example, the number of LEDs 21a and the number of LEDs 21b are properly determined in order to emit light to the image taking subject with very evenly distributed light quantities required by the image taking subject.

On top of that, the first and second embodiments described above implements the information processing system 1. However, the information processing system 1 can also be embedded in an electronic apparatus such as a personal computer. In this case, the personal computer is configured to move a pointer of the personal computer to a position located on the screen of the personal computer as a position corresponding to the characteristic point 121 extracted by the information processing system 1.

In addition, electronic apparatus employing the information processing system 1 embedded therein include a personal computer besides other apparatus such as relatively small-size apparatus, home appliances and vehicle-mounted apparatus. The relatively small-size apparatus include a mobile phone and a portable audio player whereas the home appliances include a TV receiver and a home game machine. Typical examples of the vehicle-mounted apparatus are a vehicle-mounted audio apparatus and a car navigation apparatus.

By the way, the series of processes described previously can be carried out by special-purpose hardware and/or execution of software. If the series of processes described above is carried out by execution of software, programs composing the software can be installed into a so-called embedded-type computer, a general-purpose personal computer or the like from typically a program provider connected to a network or removable media. A general-purpose personal computer is a personal computer, which can be made capable of carrying out a variety of functions by installing a variety of programs into the personal computer. In the following description, the embedded-type computer and the general-purpose personal computer are referred to simply as a computer.

Typical Configuration of the Computer

FIG. 16 is a block diagram showing a typical configuration of the computer (which can be the general-purpose personal computer) for carrying out the series of processes described above.

In the computer shown in the figure, a CPU (Central Processing Unit) 201 carries out various kinds of processing by execution of programs stored in advance in a ROM (Read Only Memory) 202 or a storage block 208. A program stored in advance in the storage block 208 is loaded into a RAM (Random Access Memory) 203 before being executed by the CPU 201. In addition, the RAM 203 is also used for properly storing data processed in the processing carried out by the CPU 201. The CPU 201, the ROM 202 and the RAM 203 are connected to each other by making use of a bus 204.

In addition, the CPU 201 is also connected to an input/output interface 205 through the bus 204. The input/output interface 205 is further connected to an input block 206 and an output block 207. The input block 206 typically includes a keyboard, a mouse and a microphone whereas the output block 207 typically includes a display unit and a speaker. The CPU 201 carries out the various kinds of processing in accordance with a command entered to the input block 206. The CPU 201 outputs results of the processing to the output block 207.

The aforementioned storage block 208 also connected to the input/output interface 205 typically has a hard disk used for storing programs to be executed by the CPU 201 and various kinds of data. A communication block 209 also connected to the input/output interface 205 communicates with external apparatus through a network such as a local area network or the Internet.

As described earlier, a program to be executed by the CPU 201 may be installed from a program provider connected to the network into the computer. In this case, the program may be installed from a program provider connected to the network into the storage block 208 by way of the communication block 209 and the input/output interface 205.

Also as described earlier, a program to be executed by the CPU 201 may also be installed from removable media 211 which is mounted on a drive 210 which is also connected to the input/output interface 205. Typical examples of the removable media 211 are a magnetic disk, an optical disk, a magneto optical disk and a semiconductor memory. In this case, the program to be executed by the CPU 201 is installed from the removable media 211 into the storage block 208 by way of the drive 210 and the input/output interface 205 when the removable media 211 is mounted on the drive 210. The drive 210 drives the removable media 211 in an operation to read out the program to be installed in the storage block 208 from the removable media 211. In some cases, the drive 210 also reads out data from the removable media 211. The drive 210 then transfers the program and the data to the storage block 208 by way of the input/output interface 205.

The removable media 211 mounted on the drive 210 as shown in the block diagram serving as FIG. 16 is a recording medium used for storing data and a program which is put in a state of being installable into the computer and executable by the computer. As described earlier, the removable media 211 can be a magnetic disk such as a flexible disk, an optical disk such as a CD-ROM (Compact Disc-Read Only Memory) or a DVD (Digital Versatile Disc), a magneto optical disk such as an MD (Mini-Disc) or a semiconductor memory. The removable media 211 is package media used for storing a program to be installed in the storage block 208. Instead of installing a program from the removable media 211 or a program provider connected to a network, the program can also be temporarily or permanently stored in advance in the ROM 202 or the hard disk employed in the storage block 208. In the case of a program installed from a program provider connected to a network into the storage block 208 by way of the communication block 209 and the input/output interface 205, the program is downloaded from the program provider to the communication block 209 by making use of wire or radio communication media such as a local area network, the Internet and/or a digital broadcasting satellite. In this case, serving as an interface, the communication block 209 typically has a router and/or a modem if necessary.

It is to be noted that, the sequence of processes described in the specification of the present application can of course be carried out at steps of the flowchart in the described order along the time axis. However, the sequence of processes may not necessarily be carried out at steps of the flowchart in the order indicated by the flowchart along the time axis. For example, the processes can also be carried out concurrently or individually on an as-demanded basis.

In addition, the technical term 'system' used in this specification of the present application implies the configuration of a confluence including a plurality of apparatus.

It is also to be noted that implementations of the present application are by no means limited to the embodiment and the modified versions. That is to say, the embodiment and the modified versions can further be changed to a variety of other versions as long as the other versions also fall within a range which does not deviate from essentials of the present application.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An image processing apparatus for extracting a characteristic point from an image, said image processing apparatus comprising:
   a first light radiation section configured to radiate light having a first wavelength to an image taking subject;
   a second light radiation section configured to radiate light having a second wavelength greater than said first wavelength to said image taking subject;
   an image taking section configured to carry out an image taking operation on said image taking subject by radiating light having said first wavelength to said image taking subject in order to generate a first photographing-result image and carry out an image taking operation on said image taking subject by radiating light having said second wavelength to said image taking subject in order to generate a second photographing-result image;
   a skin-area detection section configured to detect a skin area exposed to a skin of said image taking subject on the basis of said first photographing-result image and said second photographing-result image; and
   a characteristic-point extraction section configured to extract said characteristic point from an extraction area existing on a display image showing said image taking subject to serve as an extraction area including said skin area.

2. The image processing apparatus according to claim 1, further comprising:
   a determination-information generation section configured to generate determination information to be used for determining said extraction area on the basis of said skin area; and
   an extraction-area determination section configured to determine said extraction area on the basis of said determination information.

3. The image processing apparatus according to claim 2, wherein:
   said determination-information generation section generates specification information to be used for specifying said skin area on said display image on the basis of said skin area detected by said skin-area detection section and takes said generated specification information as said determination information; and said extraction-area determination section determines said extraction area including said skin area, which is specified on the basis of said specification information, from the entire area of said display image.

4. The image processing apparatus according to claim 2, wherein:

said determination-information generation section generates a reference, which is to be used by said extraction-area determination section to determine said extraction area, on the basis of said skin area and takes said reference as said determination information; and said extraction-area determination section determines said extraction area including said skin area from the entire area of said display image on the basis of said reference.

5. The image processing apparatus according to claim 2, wherein said extraction-area determination section determines said extraction area having a predetermined shape and a predetermined size from the entire area of said display image.

6. The image processing apparatus according to claim 2, wherein said extraction-area determination section determines said extraction area, which is configured to include a plurality of horizontal lines, from the entire area of said display image.

7. The image processing apparatus according to claim 2, wherein said extraction-area determination section takes the more recently taken photographing-result image of said first and second photographing-result images as said display image and determines said extraction area from the entire area of said display image.

8. The image processing apparatus according to claim 1, wherein said characteristic-point extraction section extracts the positions of pixels composing said skin area on said display image from said extraction area as said characteristic points and detects said skin area composed of said extracted characteristic points.

9. The image processing apparatus according to claim 1, wherein said skin-area detection section detects said skin area on the basis of differences between luminance values of pixels in said first photographing-result image and luminance values of corresponding pixels in said second photographing-result image, ratios of said luminance values of said pixels in said first photographing-result image to said luminance values of said corresponding pixels in said second photographing-result image or absolute differences between said luminance values of said pixels in said first photographing-result image and said luminance values of said corresponding pixels in said second photographing-result image.

10. The image processing apparatus according to claim 1, wherein said first wavelength denoted by symbol $\lambda 1$ and said second wavelength denoted by symbol $\lambda 2$ have values in the following ranges:

640 nm $\leq \lambda 1 \leq$ 1,000 nm; and
900 nm $\leq \lambda 2 \leq$ 1,100 nm.

11. The image processing apparatus according to claim 10, wherein:

said first light radiation section radiates invisible light having said first wavelength $\lambda 1$ to said image taking subject; and said second light radiation section radiates invisible light having said second wavelength $\lambda 2$ to said image taking subject.

12. An image processing method to be adopted by an image processing apparatus provided with a first light radiation section,
a second light radiation section,
an image taking section,
a skin-area detection section, and
a characteristic-point extraction section to serve as an apparatus for extracting a characteristic point from an image, said image processing method comprising the steps of driving:

said first light radiation section to radiate light having a first wavelength to an image taking subject;

said second light radiation section to radiate light having a second wavelength greater than said first wavelength to said image taking subject;

said image taking section to carry out an image taking operation on said image taking subject by radiating light having said first wavelength to said image taking subject in order to generate a first photographing-result image and carry out an image taking operation on said image taking subject by radiating light having said second wavelength to said image taking subject in order to generate a second photographing-result image;

said skin-area detection section to detect a skin area exposed to a skin of said image taking subject on the basis of said first photographing-result image and said second photographing-result image; and said characteristic-point extraction section to extract said characteristic point from an extraction area existing on a display image showing said image taking subject to serve as an extraction area including said skin area.

13. A non-transitory computer-readable storage device having instructions stored thereon that are configured when executed to cause a computer to:

detect a skin area exposed to a skin of an image taking subject on the basis of a first photographing-result image obtained as a result of an image taking operation carried out by radiating light having a first wavelength to said image taking subject and a second photographing-result image obtained as a result of an image taking operation carried out by radiating light having a second wavelength greater than said first wavelength to said image taking subject; and extract a characteristic point from an extraction area existing on a display image showing said image taking subject to serve as an extraction area including said skin area.

14. An electronic apparatus having an embedded image processing apparatus for extracting a characteristic point from an image, said electronic apparatus comprising said image processing apparatus including:

a first light radiation section configured to radiate light having a first wavelength to an image taking subject;

a second light radiation section configured to radiate light having a second wavelength greater than said first wavelength to said image taking subject;

an image taking section configured to carry out an image taking operation on said image taking subject by radiating light having said first wavelength to said image taking subject in order to generate a first photographing-result image and carry out an image taking operation on said image taking subject by radiating light having said second wavelength to said image taking subject in order to generate a second photographing-result image;

a skin-area detection section configured to detect a skin area exposed to a skin of said image taking subject on the basis of said first photographing-result image and said second photographing-result image; and a characteristic-point extraction section configured to extract said characteristic point from an extraction area existing on a display image showing said image taking subject to serve as an extraction area including said skin area.

* * * * *